March 25, 1941.　　　C. SMITH　　　2,236,077
AUTOMATIC STOCK QUOTATION BOARD
Filed May 29, 1930　　　13 Sheets-Sheet 1
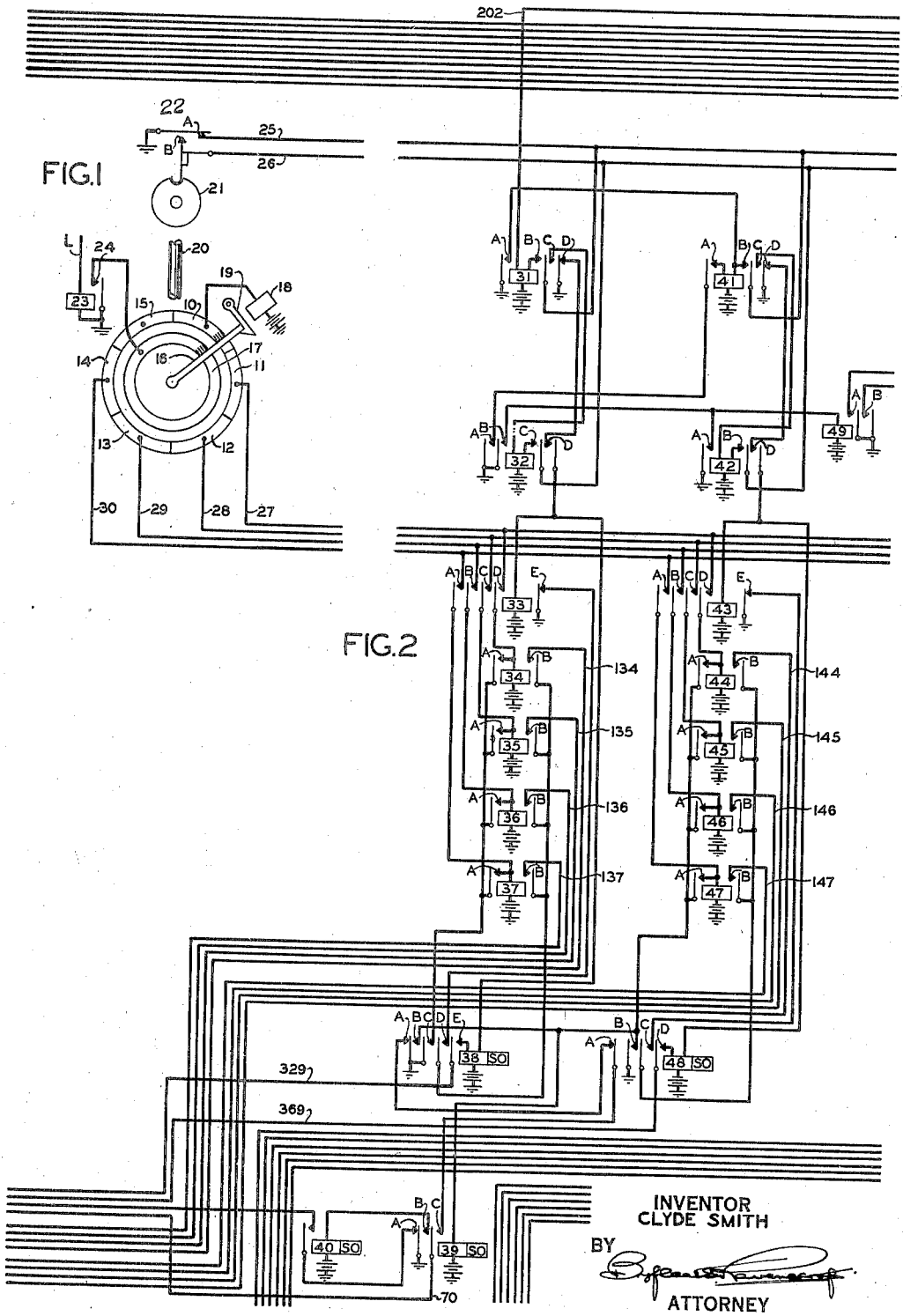

March 25, 1941.  C. SMITH  2,236,077

AUTOMATIC STOCK QUOTATION BOARD

Filed May 29, 1930  13 Sheets-Sheet 6

INVENTOR
CLYDE SMITH
BY
ATTORNEY

March 25, 1941.  C. SMITH  2,236,077
AUTOMATIC STOCK QUOTATION BOARD
Filed May 29, 1930  13 Sheets-Sheet 9
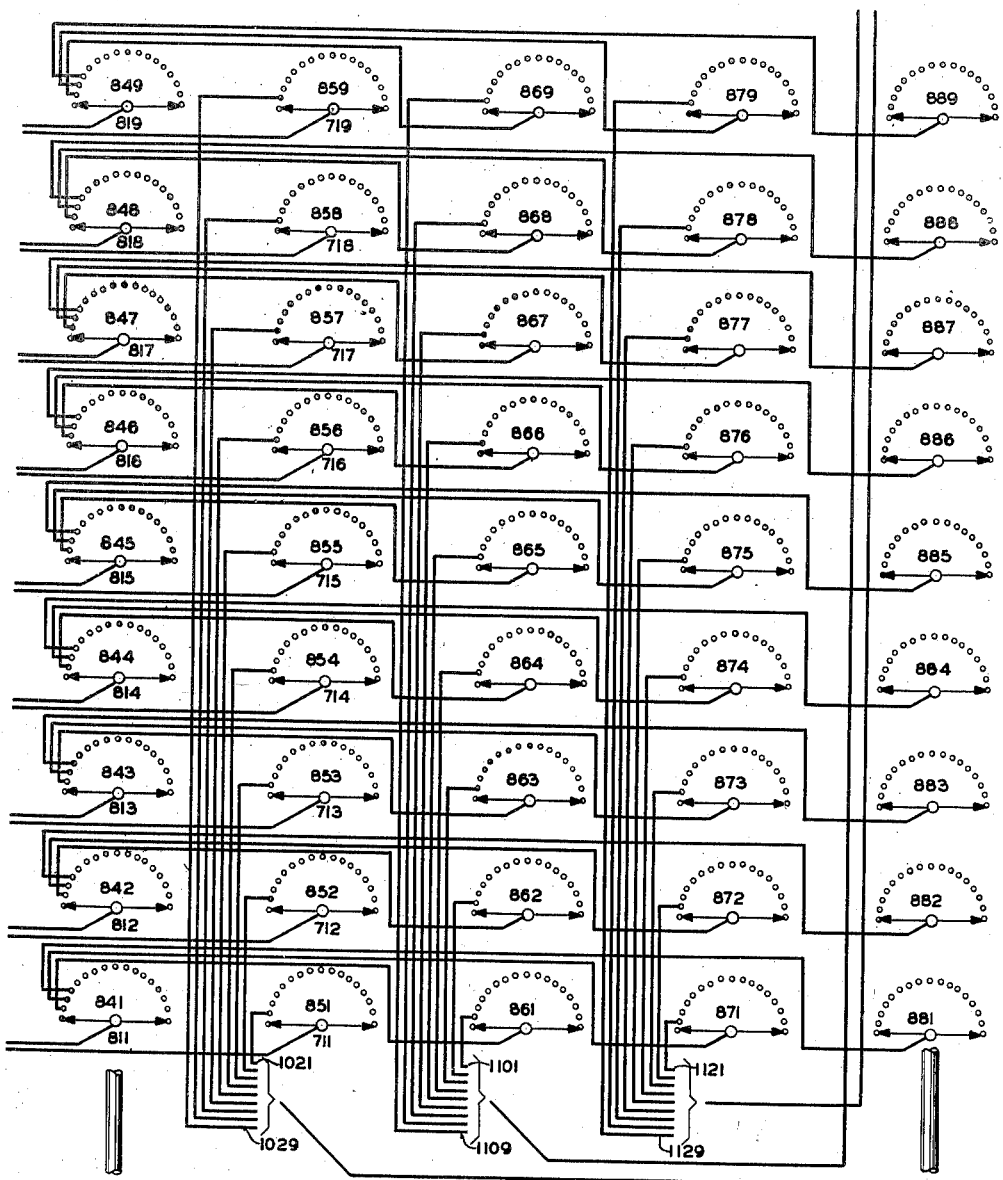
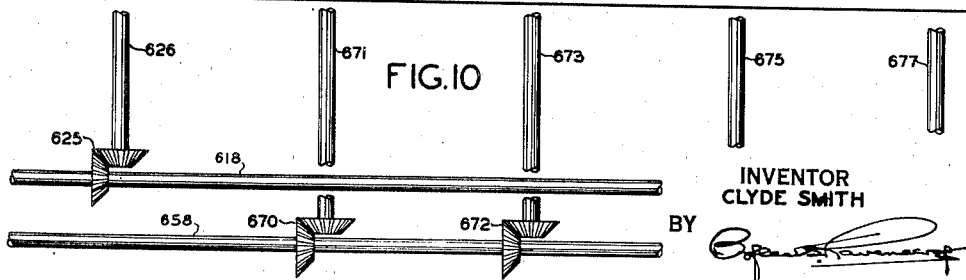
FIG.10
INVENTOR
CLYDE SMITH
BY
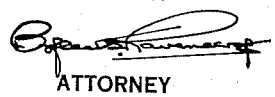
ATTORNEY March 25, 1941. C. SMITH 2,236,077
AUTOMATIC STOCK QUOTATION BOARD
Filed May 29, 1930 13 Sheets-Sheet 10

INVENTOR
CLYDE SMITH
BY
ATTORNEY

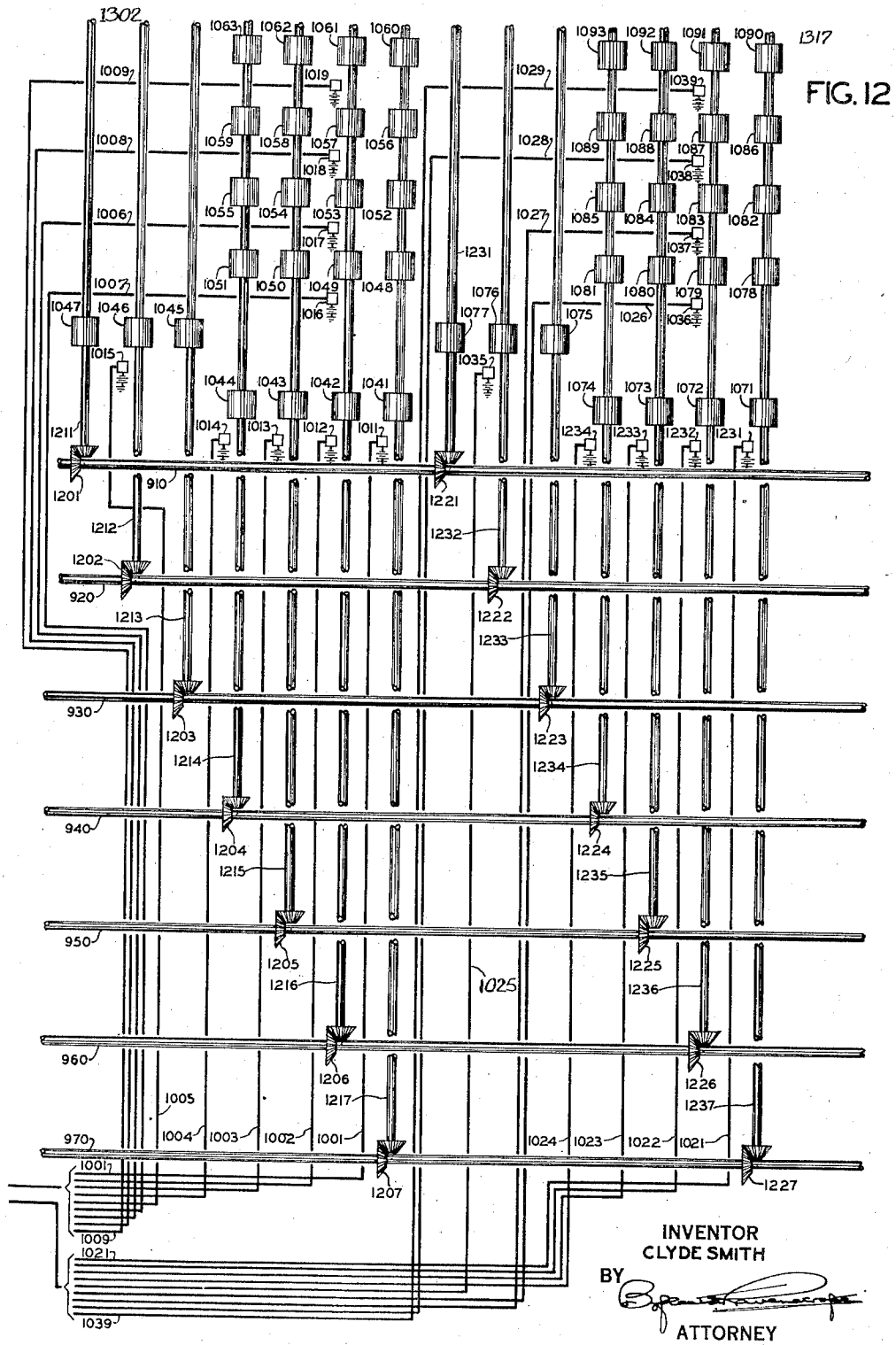

March 25, 1941.   C. SMITH   2,236,077
AUTOMATIC STOCK QUOTATION BOARD
Filed May 29, 1930   13 Sheets-Sheet 12
FIG. 14-B
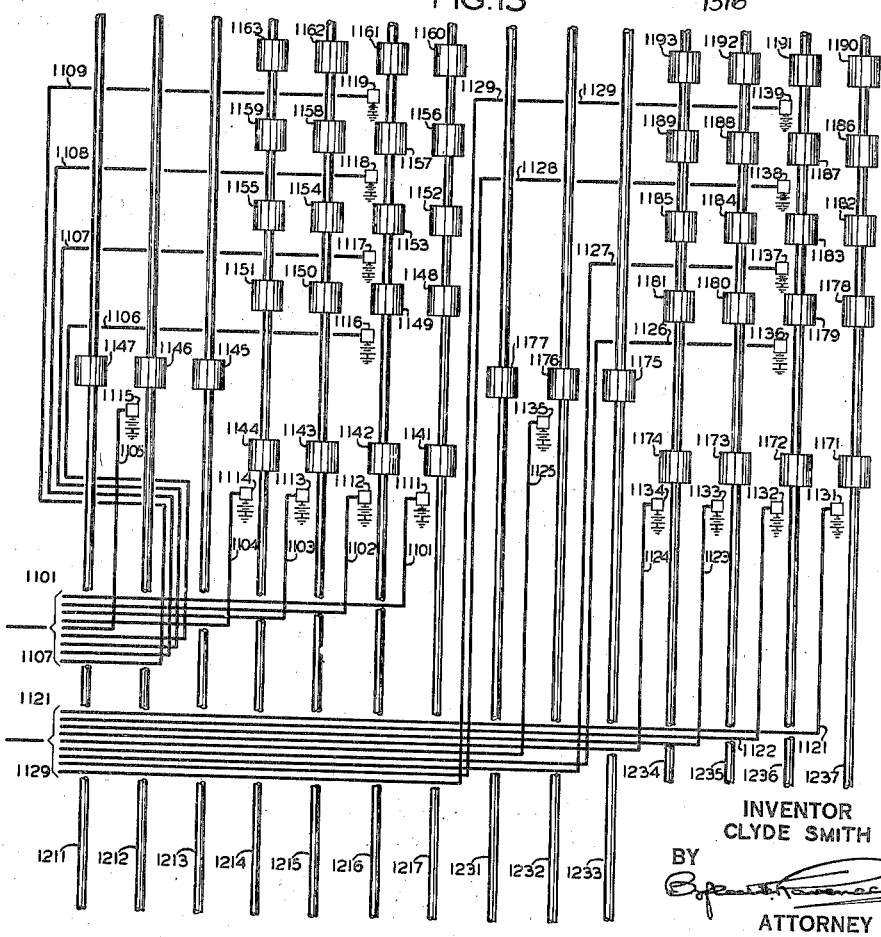

March 25, 1941.   C. SMITH   2,236,077

AUTOMATIC STOCK QUOTATION BOARD

Filed May 29, 1930   13 Sheets-Sheet 13

| 1601 | 1301 | 1316 | 1331 | 1346 | 1361 | 1376 | 1391 | 1406 | 1421 | 1436 | 1451 | 1466 | 1481 | 1496 | 1511 | 1526 | 1541 | 1616 |
|------|------|------|------|------|------|------|------|------|------|------|------|------|------|------|------|------|------|------|
|      |      |      |      |      |      |      |      |      |      |      |      |      |      |      |      |      |      |      |
| 1615 | 1315 | 1330 | 1345 | 1360 | 1375 | 1390 | 1405 | 1420 | 1435 | 1450 | 1465 | 1480 | 1495 | 1510 | 1525 | 1540 | 1555 | 1630 |

| FIG. 3 | FIG. 4 | FIG. 1 | FIG. 5 | FIG. 6 | FIG. 7 | FIG. 14B |
|--------|--------|--------|--------|--------|--------|----------|
|        |        | FIG. 2 |        |        |        | FIG. 13  |
|        |        | FIG. 8 | FIG. 9 | FIG. 10 | FIG. 11 | FIG. 12 |

INVENTOR
CLYDE SMITH
BY

ATTORNEY

Patented Mar. 25, 1941

2,236,077

UNITED STATES PATENT OFFICE 2,236,077

AUTOMATIC STOCK QUOTATION BOARD

Clyde Smith, Hopkinsville, Ky., assignor, by mesne assignments, to International Standard Electric Corporation, New York, N. Y., a corporation of Delaware Application May 29, 1930, Serial No. 457,337

3 Claims. (Cl. 177—353)

The present invention relates to stock quotation boards and especially to such boards for use with an extensive network of signalling circuits. The invention comprises a plurality of assemblies of indicating dials or drums, each such assembly being assigned by code designation to a given commodity. The dials of each assembly are arranged in due order and are capable of being separately rotated to display different numerals, such display being controlled from a near or distant automatic telegraph transmitter or equivalent impulse transmitting device. The numeral display is changed in accordance with the changes in price or quantity or both, of a commodity, through the transmission of electrical impulses corresponding to each new numeral in the new price or quantity, together with certain additional impulses for nominating, or predetermining, which of the dials of the indicating assembly are to be affected. Each of the numeral displays of an assembly may include high, low, open and previous close prices, either of which may be changed simultaneously with the last price display.

One of the features of the system is the method of nominating, or predetermining, by the use of switching mechanisms, which operation may be required for a given quotation, so that the only impulses necessary subsequently are those to effect the specific operations nominated. This effects a considerable reduction in transmission or line time, since the change from an old to a new numeral display is accomplished without return to zero and without driving the dials of a registering assembly up from zero through units and tens, and without use, either mental or automatic, of the arithmetical difference.

The method of nominating will be described by the use of an illustrative example. For registering a series of sales as IT.33.67½.12.¾.⅝, where IT represents the code designation of the stock, 33 represents the quantity of shares sold in hundreds, 67½ the full price, 12 the quantity in hundreds of a second sale, ¾ the new fraction of the price associated with the new sale of 1200 shares, the full price being 67¾, and ⅝ the new fraction associated with a third sale the quantity of which is not given, by use of the present system two nominating operations are required for the display of a quotation; while the number of selecting operations required is determined by the two nominating functions. Thus for the first quotation above, namely IT.33.67½, there will be required two nominating operations, two stock selecting operations, two quantity selecting operations and three price selecting operations. The next subsequent sale (12.¾) will require two nominating operations, two quantity selecting operations and one price selecting operation, while the third sale will require two nominating operations and one price selecting operation. Each nominating or selecting operation requires a group of received impulses. In my co-pending application for an Automatic stock quotation board, Serial Number 398,634, filed October 10, 1929, Patent No. 2,151,994, dated March 28, 1939, it was shown that for a quotation such as that illustrated above (IT.33.67½.12.¾.⅝) the number of groups of impulses required would be 17.

Although it is true then that the number of groups of impulses required for a like quotation is the same for the present and the earlier system still the present system saves a considerable amount of line time over the older system. In the earlier system referred to each group of impulses is composed of eight separate impulses the first two of which are employed to perform a nominating function. In the present system each group of impulses is composed of but six separate impulses, and the first two groups of impulses effect the nominating function. Since for the same quotation the same number of groups of impulses is required in both systems the total number of single impulses is considerably less in the present one—in the ratio of 8 for the earlier to 6 for the present system. There is then a saving in line time of 25% due to the reduction in the number of impulses per group. To show this in a more concrete manner consider the quotation IT.33.67½ requiring in each system nine groups of impulses. By the earlier system this would mean 9×8 or 72 separate impulses, in the present system this number is reduced to 9×6 or 54 impulses. Now each impulse to be equal in effect must be equal in time. Assuming each impulse to be $\frac{1}{30}$ sec. in length, in the earlier system the illustrative quotation would have required $\frac{1}{30}$ sec. × 72 or 2.4 seconds while in the present case it would require only $\frac{1}{30}$ sec. × 54 or 1.8 seconds.

In addition the earlier system required both polarities of battery in order to perform the nominating function whereas the present system requires one pole of line battery only and operates on the common "make and break" single polarity signal usual with "start-stop" systems.

Another feature of the present system is the switching arrangement by which circuits are transferred from one group of registering dial assemblies to another in such a manner that a display of price or quantity of a frequently quoted stock is effected through transmission of a lesser number of impulses than would be required in the case of a similar display for a less frequently quoted stock.

An object of the invention is to provide a complete display on registers or drums, of current prices and quantities of sales of stocks, grain, cotton and other commodities traded in at an exchange or market, as such prices and quantities are transmitted from moment to moment throughout the market day, together with auxiliary information in connection with such stocks or commodities as the opening, previous closing, low and high prices in the record.

Another object of the invention is the reduction of the number of received impulses required for a given quotation, to a minimum and the provision of means to cause any portion of the board mechanism not required for a particular quotation to be non-operative during the setting up of that quotation.

Another object of the invention resides in the provision for nominating or predetermining, according to the first received groups of impulses, which of certain indications are to be subsequently changed on the board, and, in accordance with subsequently received groups of impulses, determining what change shall take place in the indications nominated.

Again, an object of the invention resides in the provision of means for determining during reception of the first groups of impulses, which group of stocks is to be affected and, during reception of subsequent groups of impulses, selecting a definite stock from such predetermined group.

Still another object resides in the means for eliminating any motion of the indicating dials, or drums, other than that required for the actual quotation to be displayed.

Briefly the invention consists of a receiving distributor of the "start-stop" type, code selectors of a well-known type, dial switches, impulse, storage, translation, and control relays, indicator dials or drums, and the necessary power transmission source and power transmission means, arranged as hereinafter described, to accomplish the various objects mentioned above.

In the drawings:

Figure 1 shows a system of impulse reception of a well known type used for reception of impulses from the line and transmission to the board mechanisms.

Figure 2 shows the nominating control and storage relays controlled by the system of Figure 1.

Figures 9 and 10 show stock, shelf, quantity, and price selector switches, similar to the switches of Figure 4. These are used in connection with the apparatus of Figure 8 to select a definite stock display space from the entire number on the board, and to select a shelf within that space and quantity and price dials.

Figure 3:
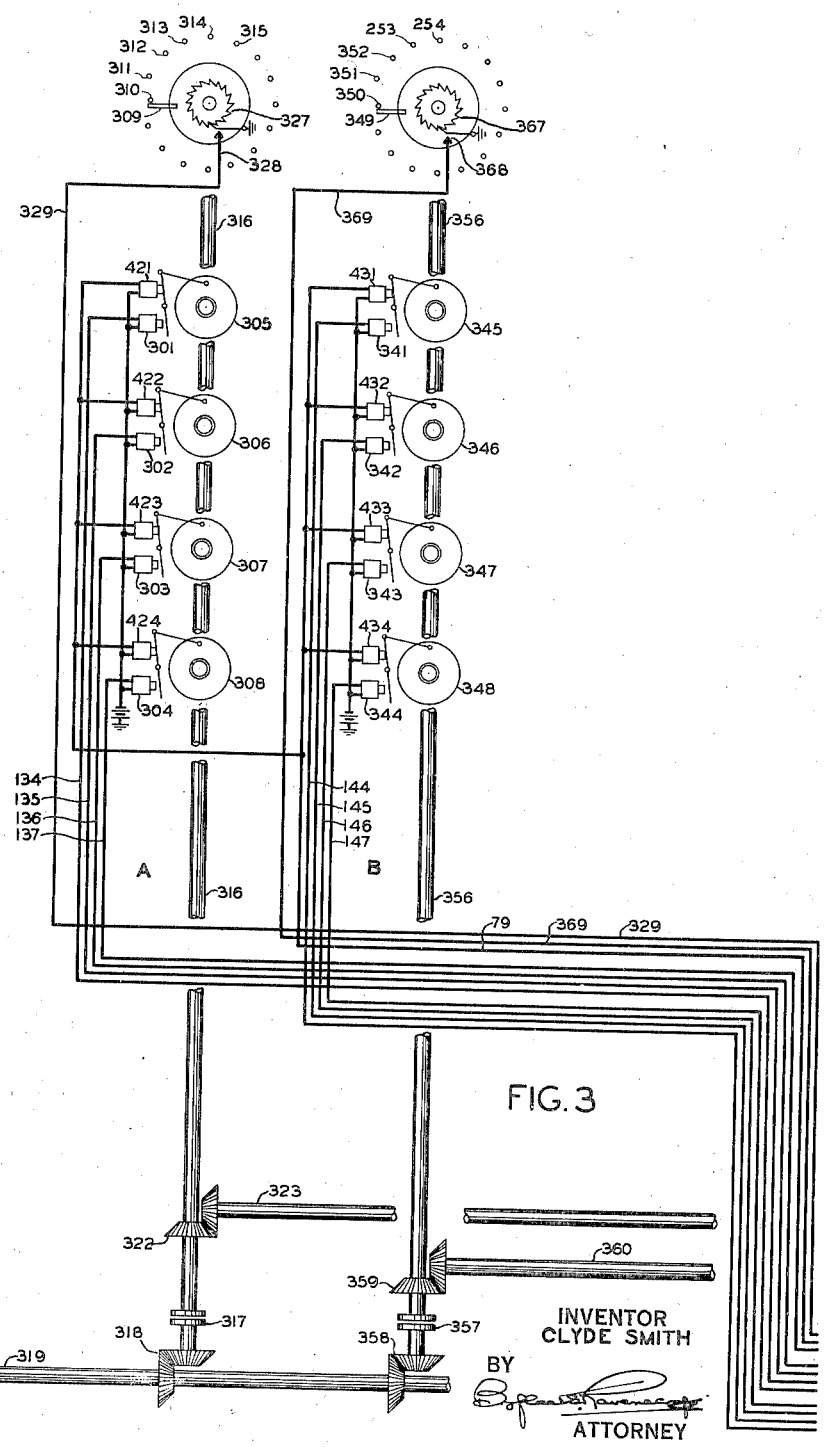
Figure 3 shows the code selective apparatus for receiving impulses from the relay system of Fig. 2 and controlling the transmission of the resulting effects to the nominating dial switches of Fig. 4.
Figure 6:
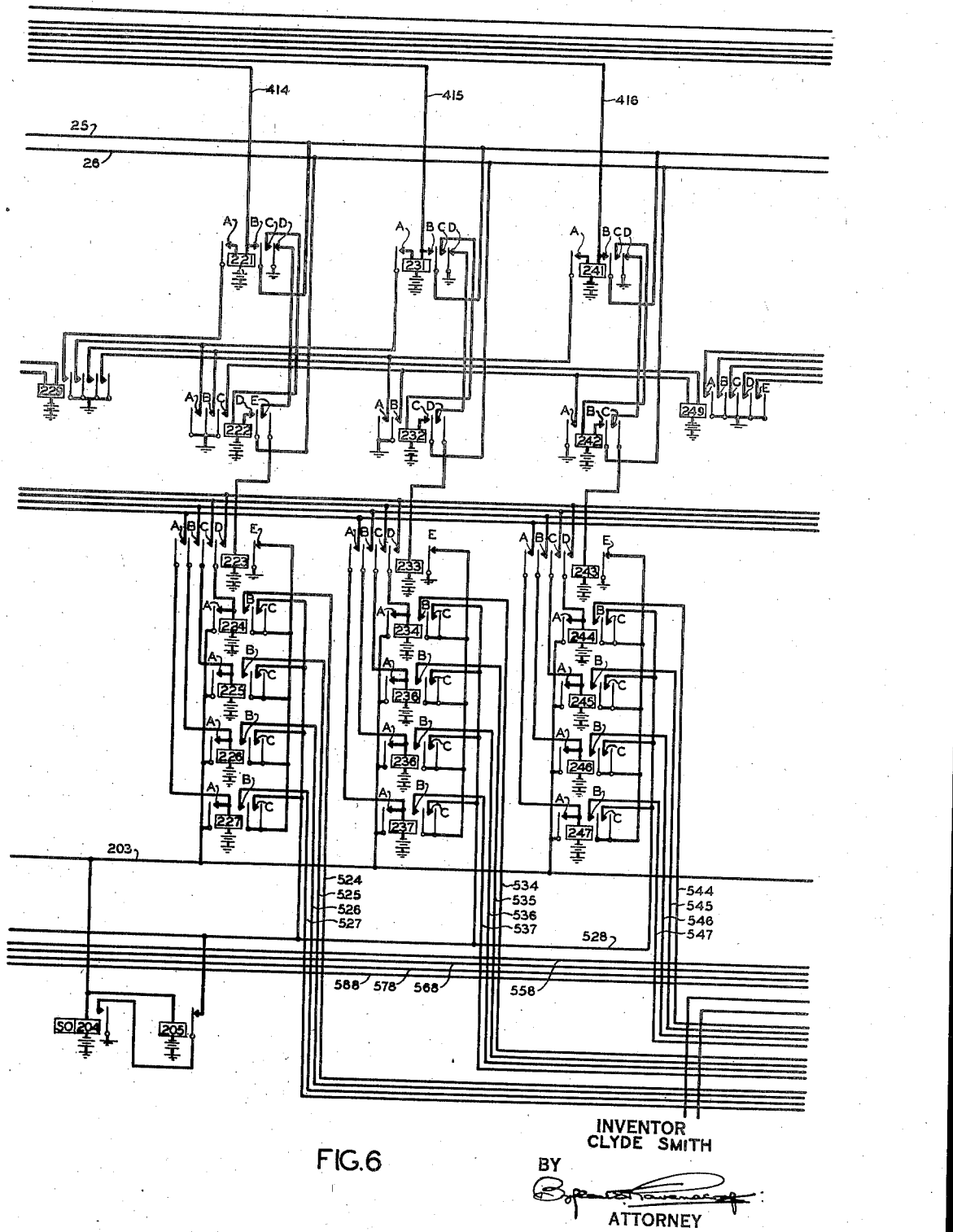
Figure 7:
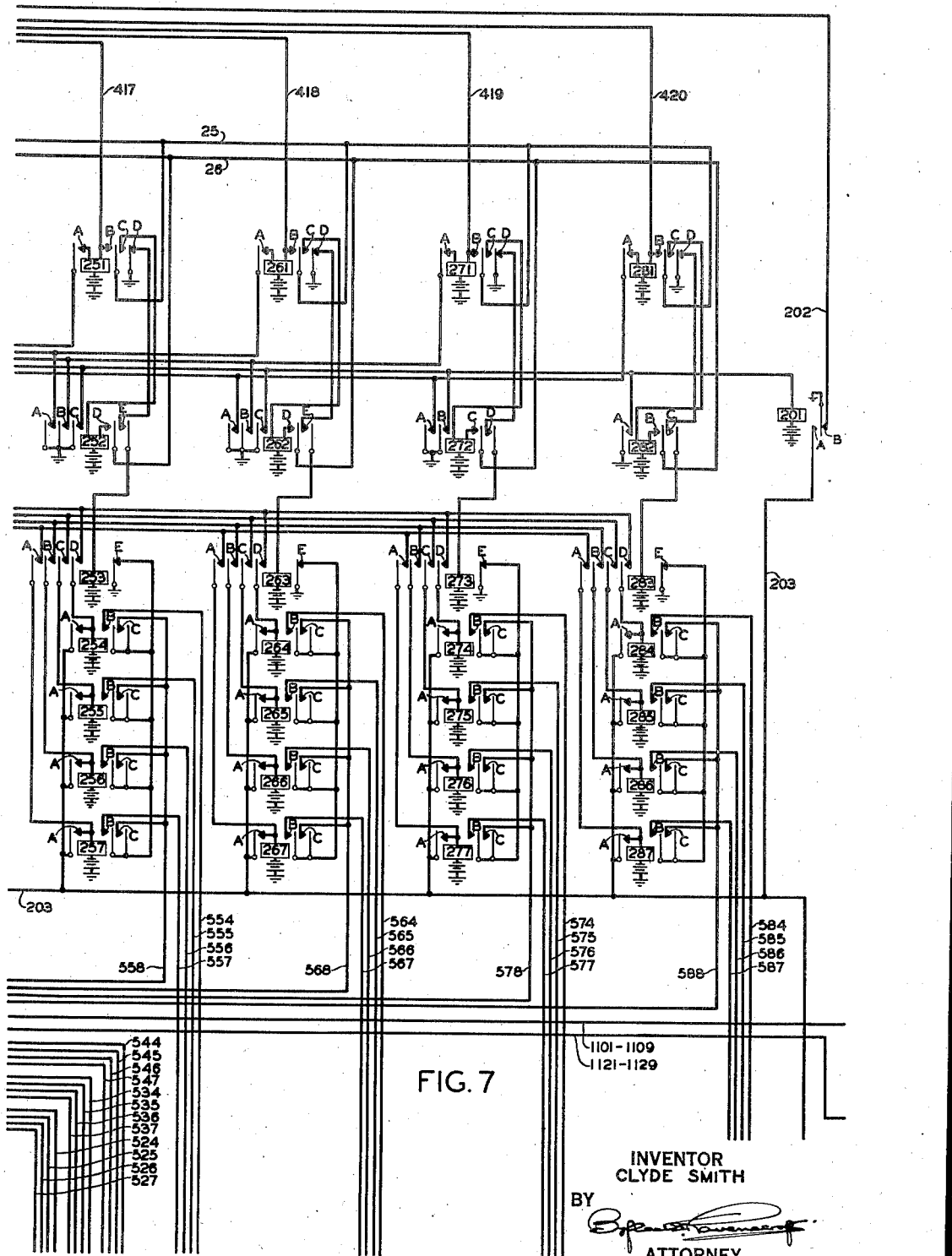
Figure 9:
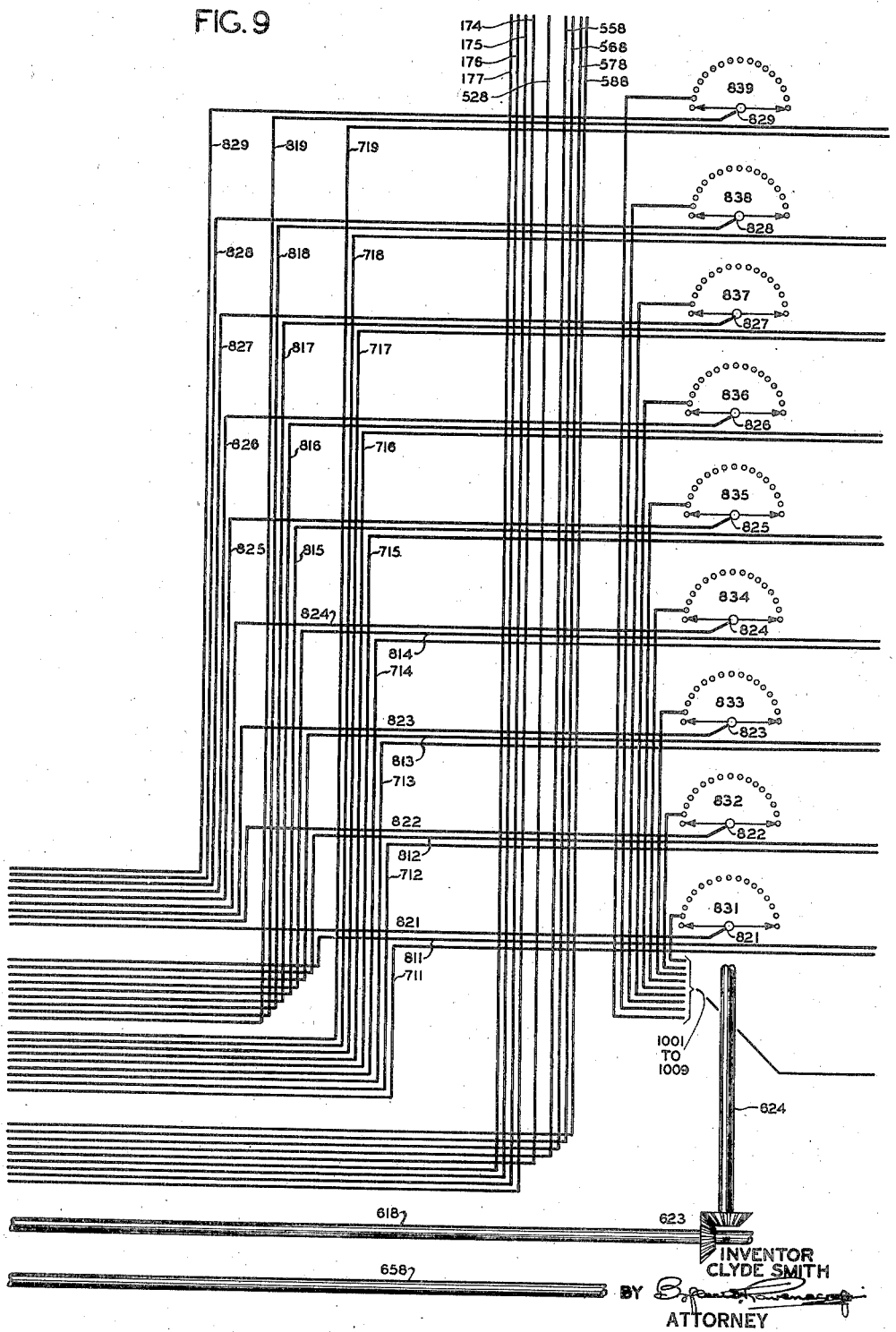
Figure 11:
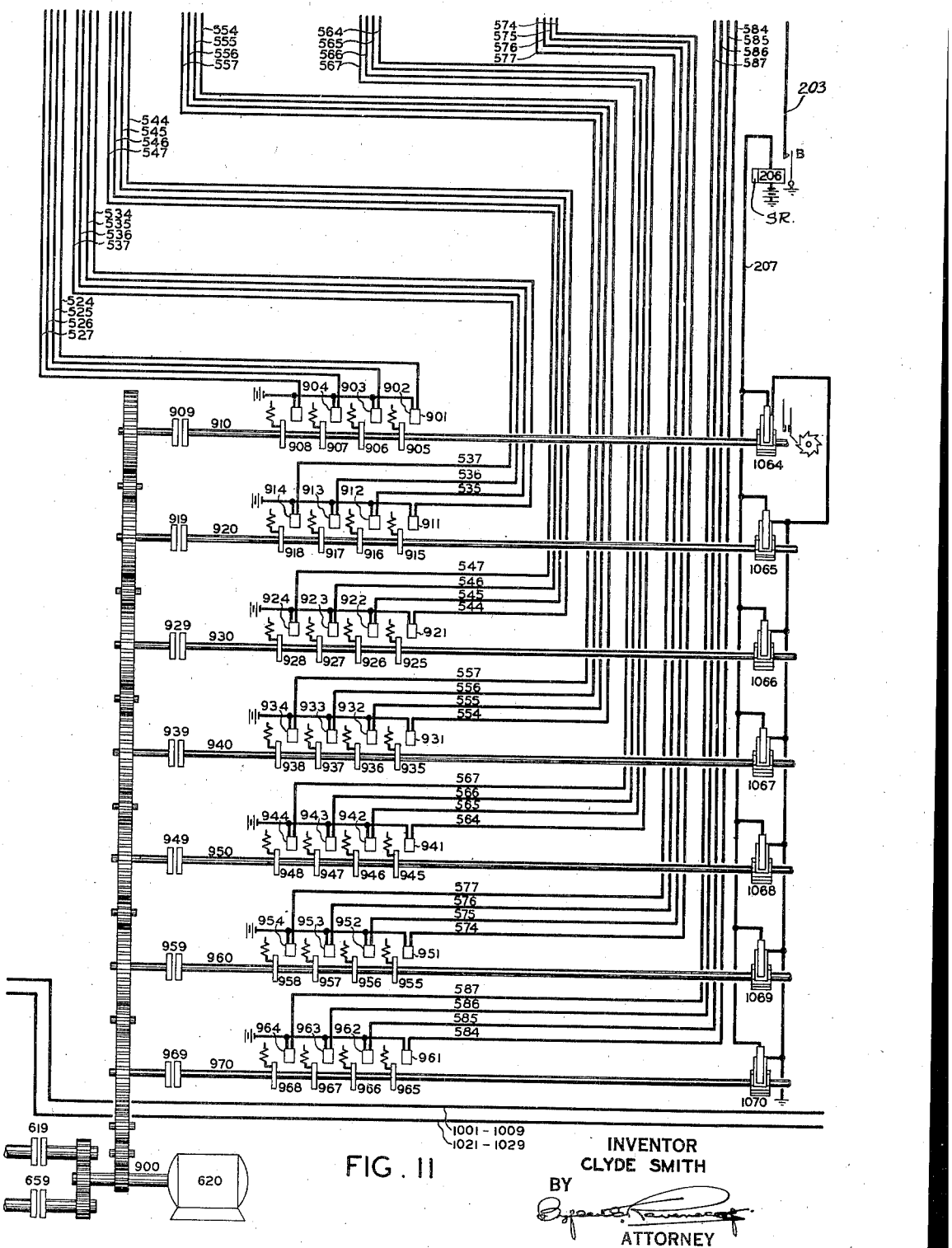

Figure 11 shows code selective apparatus similar to that of Figure 3 whereby circuit effects from the relay systems of Figures 6 and 7 are coordinated with the equipment of Figures 9 and 10 to carry out operations on the display devices of Figures 12 and 13.

Figures 12 and 13 show indicator devices which are acted upon by the devices of Figs. 6, 7, 8, 9, 10 and 11 to establish the desired indication on the board.

Figures 14A, 15:
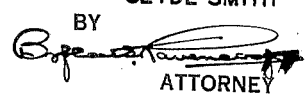

Figure 14A shows a front elevation of a typical board.

Figure 14B shows an enlarged view of one section of such a board.

Figure 15 is a diagrammatic view of the arrangement of Figs. 1–14.

The system illustrated in the drawings corresponds with the apparatus and arrangement at a single point or location; a description of this should be sufficient to convey a clear understanding of the system and also the manner in which a plurality of different stations may be connected for simultaneous control from a single transmitting point.

The four unit code selection basis will be employed to illustrate the principles of the present system; it will be obvious, however, that the circuits and equipment may be arranged for control under a five unit code basis. With the four unit code the capacity of the board is 255 stocks; by the use of the five unit code the selective capacity would be increased to 1023 stocks or commodities. The method of deriving these capacities will appear later.

For the line circuit of this system a distributor of the well known "start-stop" type is preferably employed although a "multiplex" distributor might readily be substituted. With the four unit basis there are six impulse intervals for each cycle, the distributors being so arranged that four selective or signalling impulse segments are present between the first or "start" impulse segment and the last or "stop" impulse segment of the distributor.

In Figure 1 is shown only so much of a receiving "start-stop" distributor and line equipment as is necessary to a clear explanation of the present system. The transmitting distributor, which is omitted from Fig. 1, may be of any well-known type, such as the start-stop transmitting distributor disclosed at A, Fig. 304, on page 301 of "Printing Telegraph Systems and Mechanisms" by H. H. Harrison. Applicant's transmitting distributor has only four segments, as a four-unit code is used with the present system, but it is evident that any one skilled in the art could arrange the transmitting distributor shown in this figure, for the purpose of transmitting four-unit signals. Furthermore, reference to the illustration mentioned will show clearly the relation between the transmitting distributor at the distant station and the receiving distributor shown in Fig. 1. The receiving distributor comprises a start segment 10; selective segments 11, 12, 13 and 14; stop segment 15; contactor or brush arm 16; contactor ring 17; a shaft 20 driven by a motor (not shown) for rotating the arm 16 and also the cam 21, which controls off-normal contacts 22. Ground potential is applied to ring 17 through the contacts 24 of relay 23, which relay is responsive to impulses received over line L. The armature 19 of the start magnet 18 restrains the arm 16 from rotation until reception of a "start" impulse from the line L.

In describing this system, let an instant be assumed corresponding with a moment immediately following the reception and display of a previous quotation. Relay 201 (Fig. 7) will have just released to apply ground potential over its normal contacts B, conductor 202 and the left hand winding of relay 31 (Fig. 2) to a source of current which has here been shown for convenience as the conventional grounded battery. Response of relay 31 connects ground potential over its left hand contacts A to energize a relay 41 (Fig. 2) over a path through the right hand winding of that relay to battery. Ground potential over contact C of relay 31 and the left hand winding of relay 32 energizes the latter relay. Contacts C of relay 41 complete a path through the left hand winding of relay 42 which operates. Contacts B of relay 32 connect ground to energize relay 49 (Fig. 2) which is the first of a series or chain of guard relays 49 (Fig. 2), 69 (Fig. 5), 229 (Fig. 6), 249 (Fig. 6) and 201 (Fig. 7) each of which supplies ground potential to successive ones of the chain of relays in a higher order of operation. Response of relay 201 transfers ground potential from conductor 202 to conductor 203, thus energizing relays 204 and 205 (Fig. 6) connected in parallel. Ground potential over contact spring A of off-normal contacts 22 (Fig. 1) to bus conductor 25 provides for retaining relay 31 operative through its contacts B and right hand winding, while a corresponding path from bus conductor 25 prepares for retaining relay 41 over its locking contacts B as will be presently necessary. The circuits are now in their normally operated condition under which relays 31, 32, 41, 42, 49, 69, 229, 249, 201, 204 and 205 stand operative. This condition is in preparation for reception and translation of signal impulses to effect a stock quotation or other display. The purpose of placing these relays in the position mentioned will appear during the following description.

Of the 255 stock selections possible, 225 are designated as "double letter" stocks, 15 as "single letter odd" and 15 as "single letter even." The double letter stocks require the transmission, for a similar display, of one group of signal impulses in addition to the number required for a single letter stock.

Let it now be assumed that a quotation for one of the double letter stocks is to be displayed and that the display desired is such as to require the reception of the first signal impulse of each group. As will later develop the required number of cycles of the distributor for the particular combination will be twelve.

Upon the reception of the "start" impulse the start magnet 18 releases the distributor brush arm 16 and shaft 20. Immediately contact springs A and B of the off-normal contacts 22 are operated by the cam 21 thus transferring ground potential from bus conductor 25 to bus conductor 26. Due to disconnection of the left hand winding of nominating control relay 31 under the operated position of relay 201 (Fig. 7), relay 31 releases upon the opening of contact spring A of off-normal contacts 22, its contact D connecting ground potential over contacts D of relay 32 to energize relays 33 and 38 over parallel paths. Ground potential over bus conductor 26 and contacts C of relay 32 retain this relay energized following disconnection of its left hand winding due to release of relay 31. Ground potential over a path through contacts B of relay 38 energizes a relay 39 which in turn connects ground potential over its outer make contacts B to energize relay 40. Due to operation of relay 33 four bus conductors 27, 28, 29 and 30 from segments 11, 12, 13, 14 of the distributor now stand connected through contacts D, C, B and A respectively of relay 33 to a group of nominating storage relays 34, 35, 36, and 37.

Arrival of the first selective impulse over the line will result in ground potential being connected to contactor ring 17 at the instant the brush arm 16 has bridged to segment 11. Thus relay 34 will operate due to the closed path from ring 17 to battery through its winding. Immediately relay 34 locks in its operated position due to a ground placed on its locking contact A from contact C of relay 38, which substitutes for the momentary ground from the distributor segment.

Under the present quotation requiring only the first impulse of each signalling group no effects are had while brush arm 16 sweeps over segments 11, 12, 13 and 14 to arrive at segment 15, at which time a "stop" impulse or interval will serve to bring the brush arm to rest in the position shown in Fig. 1. Response of off-normal contacts 22 transfers ground from bus conductor 26 back to bus conductor 25. This permits release of relay 32 and, in turn, release of relay 33; also disconnection of the right hand winding of relay 38. The release of relay 33 disconnects the four distributor conductors 27, 28, 29, 30 from the first group of storage relays 34 through 37 and also places a ground on its own contact E for use as presently will be described. As indicated by the usual convention in the drawing, relay 38 is of the slow-to-release type and therefore retains its armature despite the removal of ground from its winding when contact D of relay 32 opened. As will presently appear, energy is again applied—this time through the left hand winding—to relay 38 before it has released. Ground potential over bus conductor 25 and the locking contact B and right hand winding of relay 41, previously operated, retains that relay in its operated position following the disconnection of its left hand winding under release of relay 32. In turn, relay 42 locks up through its own left hand winding and contact C of relay 41. In its released position contacts E of relay 33 complete a path over contacts D of relay 38, contacts B of relay 34 and conductor 134 to energize a code setting magnet 301 (Fig. 3). This operation corresponds to the single signal impulse received over the line and, since no impulses were stored on relays 35, 36 or 37 (Fig. 2), this action serves alone for setting the selective elements of a code disc selective assembly 305 to 308.

The code setting mechanism may be of the well known Creed type disclosed in U. S. Patent No. 1,639,213 and, therefore, only such parts as are necessary to this description are shown. For the sake of clarity the parts have been shown in a detached arrangement, it being understood, however, that the parts with other necessary elements may be assembled to form a compact and rugged unitary structure.

The code setting unit is arranged on the well known four unit basis corresponding with like capacity of the distributor (Figure 1) as indicated by its four selective segments 11, 12, 13 and 14, and also the capacity of the impulse storing relay groups 34 to 37, 44 to 47 etc. As shown in Fig. 3 at A four code discs 305, 306, 307 and 308 are provided with central bores which permit them freely to encircle a shaft which serves as a common bearing to allow the discs respectively to be rocked by magnets 301 to 304 suitably linked thereto as shown. The peripheries of the discs are predeterminately notched in a manner to provide a zero or normal position and 15 selectable points for an arm 309 fixed to be rotated by the shaft 316. Transverse members 310, 311, 312 etc. are so arranged that they may come in the path of the arm 309 when the slots under them are brought into alignment. The entire assembly is fixed independently of the shaft 316 so that engagement of arm 309 with the zero stop pin 310 or any other of the pins 311, 312, 313, etc. will retain the shaft 316 stationary against its tendency to rotate under couple of a slip clutch 317 connected to a continuously operated system of shafting. Movement of code disc 305 will lift zero stop pin 310 from the path of arm 309 while aligning the first series of slots to permit code pin 311 to enter therein and thus be brought into the path of the arm 309. Any code setting may continue effective until the discs have been retracted to normal by reverse movement of the armature of the respective code setting magnet. In order to effect this resetting respective magnets 421, 422, 423 and 424 have been provided.

Figure 4:
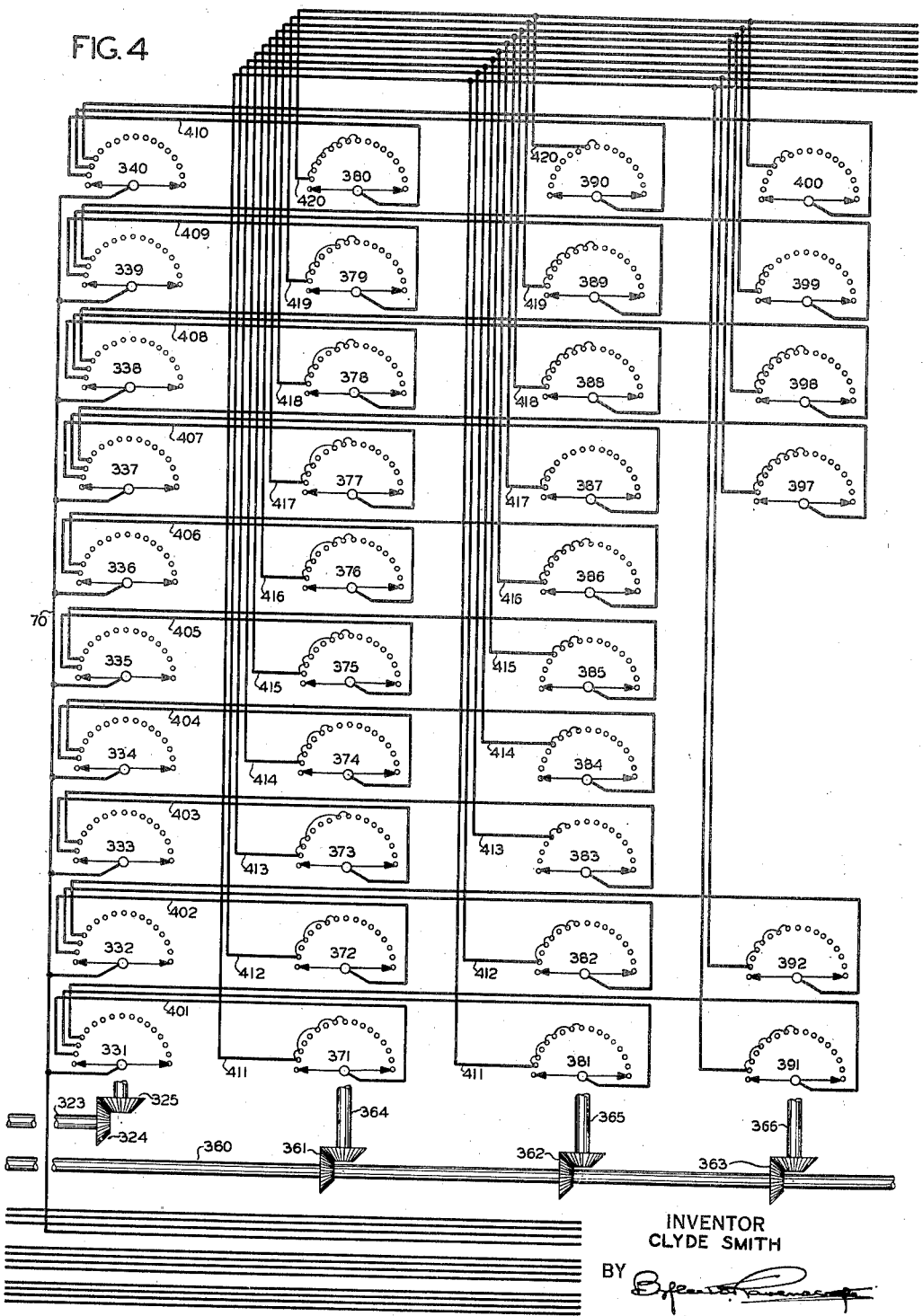
Figure 4 shows the nominating dial switches, the positions of which are controlled by effects from the code selector apparatus of Fig. 3.
Figure 5:
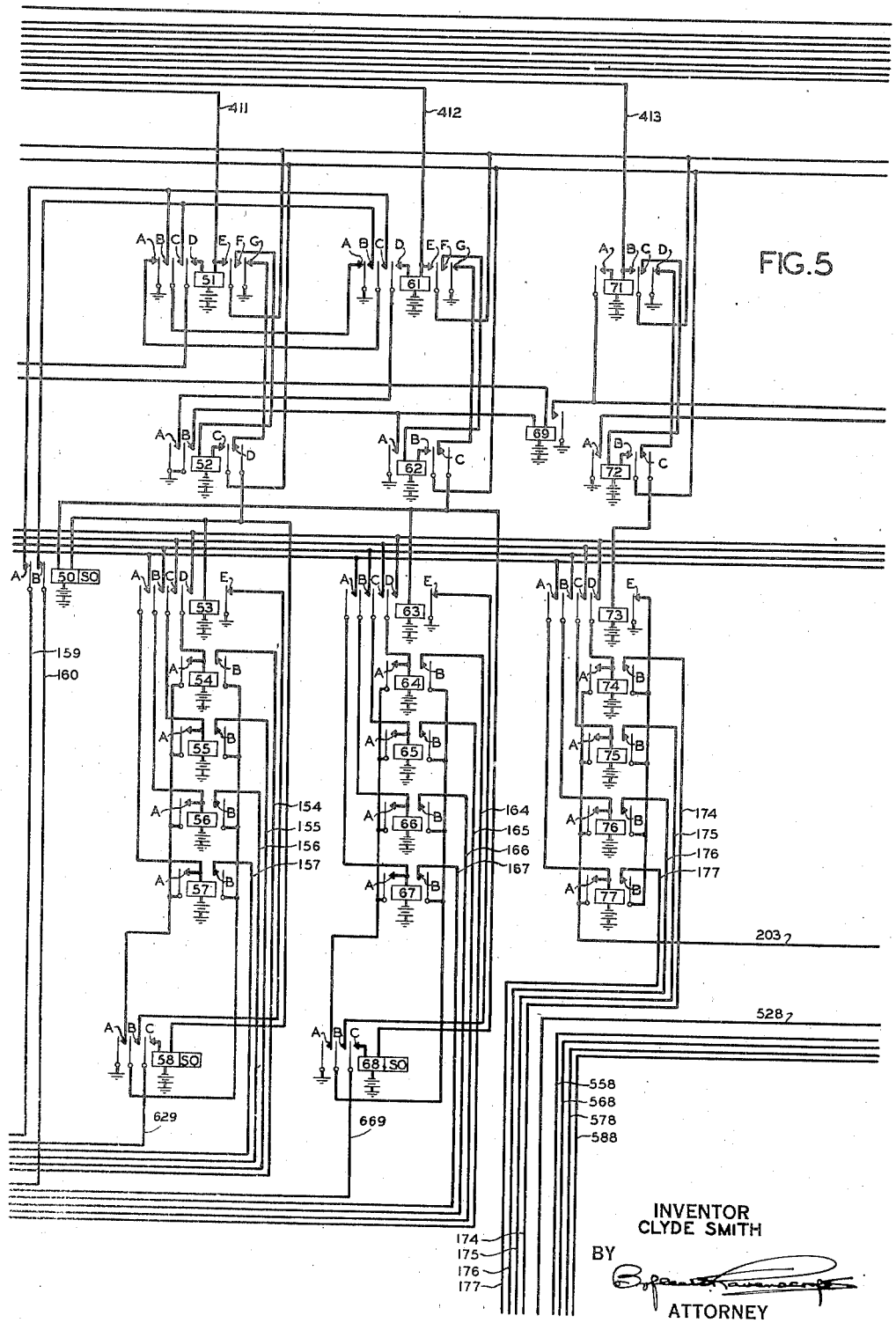
Figures 5, 6 and 7 show ten translation control relays and their associated recording relays. These translation control relays operate or remain non-operative according to the position of the nominating switches of Fig. 4, which control them.

Continuing the description of the selective operations, attention will be returned to the moment at which energization of magnet 301 (Fig. 3) took place in shifting code disc 305 to cause removal of the zero pin or bar 310 from the path of arm 309, while at the same time providing register of the discs so that code pin 311 may fall within the path of this arm. The shaft 316 coupled over the slip clutch 317, gear 318 and shaft 319 driven by motor 320, may therefore rotate clockwise until the arm 309 encounters the code pin 311 thereby effecting cessation of rotation. A gear 322, shaft 323 and gear 324 couple shaft 316 synchronously to drive shaft 325 to which are fixed the radial contactor arms of a plurality of multi-point nominating dial switches 331 through 340 (Fig. 4). Thus the code pins of the code setting devices determine on which respective segments the contactor arms of switches 331 through 340 shall come to rest. In the present assumed instance the contactor arms will stop on the respective first segments of the switches 331 to 340. The toothed wheel 327 (Fig. 3) fixed to rotate with the shaft 316 is adapted to intermittently close contacts 328 applying ground over conductor 329 and the locking contacts E and left hand winding of relay 38 (Fig. 2) for retaining the latter relay in its operated position. Thus when shaft 316 comes to rest contacts 328 open and permit release of relay 38. Pending the reception of additional impulses from the line, the devices of Fig. 3 continue in the position just described.

Attention will now be returned to the distributor (Fig. 1) which is at rest following its first revolution; an instant corresponding with the arrival of the second group of impulses for the quotation will be considered. Under the release and rotation of shaft 20 the off-normal contacts 22 transfer ground from locking bus conductor 25 to holding bus conductor 26. This permits release of nominating control relay 41 (Fig. 2) while bus conductor 26 supplies ground for retaining relay 42 (Fig. 2) under its self-locking circuit, composed of contact B and its right hand winding, following disconnection of its left hand winding due to release of its mate relay 41. Thereupon, the normal grounding contact D of relay 41 effects response of parallel connected relays 43 and 48 (Fig. 2; relay 39 being actuated in response to the operation of relay 48). Relay 43 connects the four bus conductors 27—30 of the distributor to the second group of four nominating storage relays 44—47. Thus on reception of an impulse over the line, a circuit will be closed by the distributor to effect response of relay 44. Relay 44 is then locked in its operated position by a substitution of ground potential, over its contacts A and the grounding contacts B of relay 48, for the momentary ground from the distributor. Following the single selective impulse, the distributor continues without further effect to its stop position where off-normal contacts again transfer ground to bus conductor 25 from bus 26, thus disconnecting relay 42 and in turn relays 43, 48 and 39. A circuit over contacts E of relay 43, contacts C of slow-to-release relay 48, contacts B of relay 44 and conductor 144 effects response of code setting magnet 341 (Fig. 3). The equipment 341 to 348 corresponds to the equipment 301 to 308 which has already been described. Response of magnet 341 effects retraction of member 350 to release arm 349 while interposing a member 351 to intercept this arm. The arm 349 is fixed to rotate with a shaft 356 driven by slip clutch 351. Shaft 356 and gears 359 drive shaft 360 which carries gears 361, 362 and 363 for simultaneous drive of respective shafts 364, 365 and 366. The latter shafts carry contactor arms of ten nominating dial switches 371 through 380 for shaft 364, 381 through 390 for shaft 365 and 391 through 400 for shaft 366 (Fig. 4). Under the present assumed rotation of the shafts, the contactor arms of switches 371 through 400 will all be positioned and brought to rest on the respective first contact segments of these switches. For this setting only the ten switches 371 through 380 will be effective as the contactor arms of these switches only are connected to the first contact points of the ten switches 331 through 340. Under rotation of shaft 356, an associated toothed wheel 367 applies ground potential over contacts 368, conductor 369 and the locking contact D and left hand winding of relay 48 (Fig. 2) to retain the latter relay in locked position.

Relay 38, having already released, effected release of relay 34 while relay 48 finally released and disconnected relay 44, after shaft 356 had come to rest. Although relay 39 is thus disconnected at the grounding contacts B of relays 38 and 48, retention of its armature under slow-to-release characteristics permits momentary closure of ground potential over a series path composed of contact A of relay 38, contact A of relay 48, contact C of relay 39 and a conductor 70 connected common to the contactor arms of the ten nominating dial switches 331 through 340. Since the first contact on each of the latter ten switches is connected over conductors 401 to 410 respectively to the contactor arms of nominating dial switches 371 through 380, ground potential from conductor 70 is thus branched over a group of ten conductors 411 to 420 connected from the first contact points of the switches 371 through 380. Current over these conductors energizes ten translation control relays 51, 61, 71 (Fig. 5), 221, 231, 241 (Fig. 6), 251, 261, 271, 281 (Fig. 7). Following response of the latter relays their locking contacts B or E close respective holding circuits over bus conductor 25 and off-normal contacts 22 of the distributor (Fig. 1). Circuits are thus prepared for the reception of the remaining ten groups of impulse intervals which reception will presently be described.

It will be seen from the manner in which the nominating dial switches of Figure 4 are wired that the positions of the contactor arms of these switches determine how many and which ones of the ten translation control relays operate. These translation control relays arrange circuits to definite indicator dial controls and thus determine exactly what changes may subsequently take place on the board but do not in any manner determine the value of such change. In order that the description of the operation of the board mechanisms during the remaining ten cycycles of reception of the assumed quotation may be more clear a brief description of the functions of these various relays will be given at this time. Relays 51 and 61 determine, in combination, whether selections subsequently to be received shall be effective on the single letter odd, single letter even or double letter group of indicators.

Relay 71 determines if there is to be a shelf selection; that is whether there is to be a change in the position of the indicators associated with either the High, Low, Open or Previous close quotations. If the selection of the first two cycles have been such that this relay has been operated one of the shelves will be selected and a change on that shelf will occur.

Relays 221, 231 and 241 control respectively the ten thousands, thousands and hundreds dials of the quantity shelf and determine whether or not there is to be a change in the indications given by these dials.

Relays 251, 261, 271 and 281 determine, respectively, if changes are to be made in the hundreds, tens, units or fractions place of the last price indication. The precise manner in which the foregoing relays control these operations will appear as the description of the reception of the assumed quotation is continued.

Following the operation of the ten translation control relays as described, slow-to-release relay 39 finally restores to transfer ground from the bus lead 70 to a path by way of the contacts of relay 40, retained under its slow-to-release characteristics following its disconnection due to release of relay 39, and a conductor 79 to energize parallel connected release magnets 421 to 424 and 431 to 434 (Fig. 3).

This effects retraction of code pins 311 and 351 and also the positioning of zero pins 310 and 350 in the paths of arms 309 and 349 respectively. The resulting rotation of shafts 316, 325, 356, 364, 365 and 366 brings the code devices 305 to 308 and 345 to 348 to normal or zero while nominating switches 331 to 340 and 371 to 400 will also be advanced to their normal position. Thus all the devices of Figs. 3 and 4 are left inert in their normal positions.

Other effects set up by the response of the translation control relays 51, 61, 71, 221, 231, 241, 251, 261, 271 and 281 are the closing of circuits to energize the respective mate relays 52, 62, 72, 222, 232, 242, 252, 262, 272 and 282. Guard relay 69 will now be retained jointly by relays 52 and 62 by means of the two parallel paths from ground, one over contacts B of relay 52 and the other over contacts A of relay 62. The interrelation of the control of the pairs of relays 51 and 52, 61 and 62 etc., substantially correspond with the inter-relation of the controls of the first two pairs of relays 31 and 32, 41 and 42, and as the latter controls have already been described, it will be unnecessary to further consider these specific features.

Figure 8:
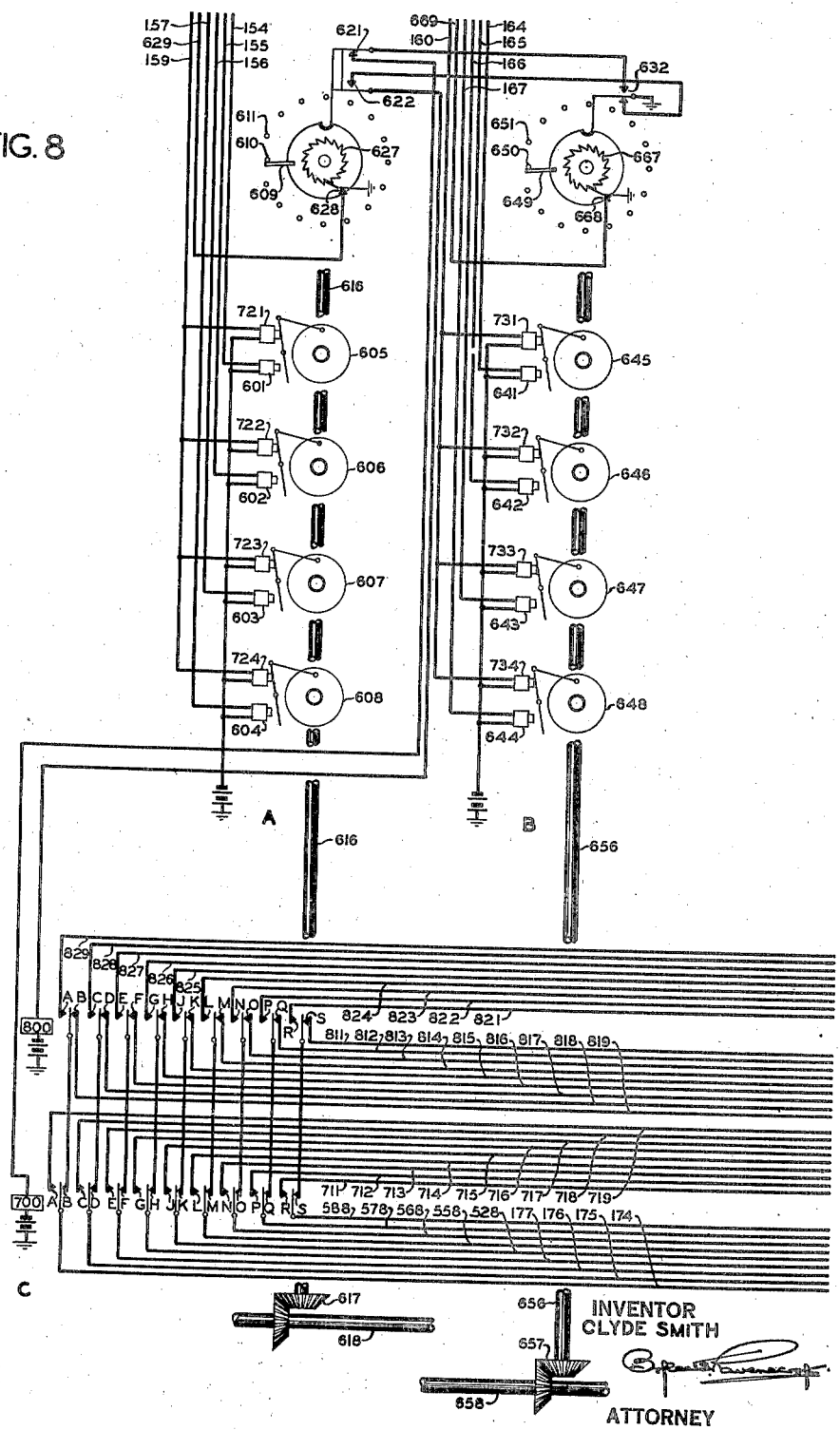
Figure 8 shows code setting apparatus similar to that of Figure 3, controlled from the relays of Figure 5 and adapted to serve jointly with the equipment of Figures 9 and 10 for carrying out operations on display drums of Figures 12 and 13. Also shown in Figure 8 are switches for the purpose of transferring certain circuit effects from one group of indicator dials or drums to another.

At the time the translation control relays respond ground potential over contact B of relay 51, contact A of relay 50 and conductor 159 is applied to the four parallel release magnets 721 through 724 of the code setting mechanism of Fig. 8. A similar circuit established through contact B of relay 61, contact B of relay 50, and conductor 160 energizes parallel connected release magnets 731 through 734. This energization of the two groups of release magnets insures that the code setting devices and the associated selector dial switches 831 to 889 (Figures 9 and 10) will be found at their respective zero or normal positions when the impulses of the assumed quotation arrive for translation.

Upon arrival of the start impulse of the third group of impulses the transfer of ground from conductor 25 to conductor 26, due to the closing of the off-normal contacts 22, results in release of relay 51, which release causes ground to be applied through contact G of relay 51 and contact D of relay 52 to the windings of relays 50, 53, and 58. Thus the contacts of relay 50 open circuits which include release magnets 721 through 724 and 731 through 734. Operation of relay 53 sets up circuits through its contacts D, C, B, and A respectively, from the distributor bus conductors 27, 28, 29 and 30 to storage relays 54, 55, 56 and 57. At this time the first selective impulse is received and energizes relay 54 which immediately locks up due to the circuit set up over its own locking contact A and the grounding contact A of relay 58. Since as before the first selective impulse only is received, no further effects take place until the distributor contactor arm reaches its normal position. When this occurs cam 21 causes off-normal contacts 22 to transfer ground from conductor 26 to conductor 25. This ground transfer opens the locking circuit through contact C of relay 52 and permits that relay to release, which action opens the paths through contact D of relay 52 and the windings of relays 50, 53 and 58. Relay 53 releases; however, relays 50 and 58 remain operated due to their slow-to-release characteristics. A circuit over the grounding contacts E of relay 53, contacts B of relay 58, contact B of relay 54 and conductor 154 is established and energization of code setting magnet 601 (Fig. 8) of code units 605—608, which are similar to the code units 305 to 308 of Fig. 3A, takes place. Corresponding with the single signal impulse received, zero or normal member 610 will be retracted from, and code member 611 interposed in, the path of arm 609. Arm 609 and with it shaft 616 then advances until stopped by member 611. The shaft 616 is stressed for rotation over gear 617, shaft 618 and slip clutch 619, which is shown in the drawings as driven by motor 620, (Fig. 11) although it would probably, in practice, be driven by motor 320 (that is all shafts would probably be driven by one motor). Shaft 618 is connected through gears 623 and 625 (Figs. 9 and 10) to drive respective shafts 624 and 626 to which are fixed respectively contactor arms of selector dial switches 831 to 839 and 841 to 849. Therefore, under the rotation of the shaft 618 as just described, the latter selector switch contactor arms will come to rest on their respective first contact points.

Under the first motion of shaft 616, a system of off-normal contacts, shown in side view in Fig. 8, formed of normally closed contacts 621 and normally open contacts 622 will be operated to separate the former and close the latter contacts. This closes a path for ground potential from normal contacts of off-normal switch 632 over the contacts 622 to the winding of relay 800. Relay 800 operates and causes its armatures to move to their left hand contacts. A toothed wheel 627 driven by shaft 616, intermittently closes contacts 628, applying ground potential over conductor 629 and locking contacts C and winding of relay 58 (Fig. 5) to retain the latter relay during the period the shaft remains in motion. Therefore, on separation of contacts 628, when the shaft 616 comes to rest, relay 58 releases. When contacts A of this relay open ground is removed from relay 54 which also releases. This causes all the relays 51 to 58 to restore.

Upon reception of the fourth group or cycle of selective impulses of the quotation assumed, operation of off-normal contacts 22 due to the start of the distributor, transfers ground from conductor 25 to conductor 26 so that relay 61 releases and closes a circuit through its contact G and contact C of relay 62 to energize relays 63 and 68 and at the same time energize the left hand winding of relay 50 to operate that relay. In the same manner as was indicated in describing the operation of the previous relay groups, the operation of relay 63 connects the distributor bus conductors to the recording relays. The first selective impulse of the fourth cycle is now received and causes relay 64 to operate and lock. Upon completion of the distributor cycle, cam 21 again permits off-normal contacts 22 to restore to normal thus transferring ground from conductor 26 to conductor 25. This permits release of relay 62 and, in turn, disconnection of relays 50, 63 and 68. Thereupon, ground potential over contacts E of relay 63, contacts B of relay 68 (held under its slow-to-release characteristics) contacts B of relay 64 and conductor 164 is applied to code setting magnet 641 (Fig. 8).

Operation of magnet 641 retracts zero pin 650 from and interposes selective pin 651 in the path of arm 649 which is fixed to shaft 656. Shaft 656 is driven by gear 657 which is fixed to a shaft 658 driven from motor 620 through slip clutch 659. Shaft 658 is joined through gears 670, 672, to shafts 671, 673, 675, 677 (Fig. 10) respectively. The contactor arms of selector dial switches 851 to 859, 861 to 869, 871 to 879 and 881 to 889 are respectively fixed to be rotated by the last four mentioned shafts. In a manner similar to that already described for operation of the other code mechanisms, shaft 656 governs the simultaneous rotation of the contactor arms of selector dial switches 851 to 889 to their respective first contact points. During the latter operation ground potential effected by wheel 667 over contact 668, conductor 669, locking contacts C and left hand winding of relay 68 retains that relay in its operated position. On completion of the switch setting operation and separation of contacts 668 relay 68 is released and due to the opening of contact A of that relay the recording relays 64 through 67 are released.

Since relays 61, 62 and 63 have already been released all relays 61 through 68 are now released. Relay 50 is also released at this time but this has no effect as its control circuits were disconnected when relays 51 and 61 restored at different moments during the operations already described. Under the movement of shaft 656, the off-normal contacts (Fig. 8) 632 were separated. This disconnected relay 800 which had been energized as already described, in preparation for circuit changes to be provided in the event that the quotation under reception may not have required the cycle of operation for affecting the code setting equipment 645 to 648. Closure of the off-normal contacts 632 is without effect at this time as this control for relay 700 is not required in the present quotation and has been disconnected by separation of contacts 621.

During the reception of the fourth cycle of impulses, release of relay 62, in addition to carrying out the circuit changes already mentioned also effected final disconnection of chain or guard relay 69. Aside from removing locking ground from the left hand winding of relay 71, the release of relay 69 was without effect as the next chain relay 229 (Fig. 6) continued energized over its left hand winding and the grounding contacts A of relay 72 which is now in its operated position.

The face of the display board, as shown in Fig. 14A, is divided into 255 blocks or spaces marked for convenience of description, 1301 to 1555. To each one of these spaces a particular stock is assigned. At the side margins of the board the spaces 1601 to 1615 and 1616 to 1630 serve for duplicate markings which form headings for transverse rows extending entirely across the board. As shown in Fig. 14B these markings comprise the usual descriptive headings for a stock quotation board and in the present system may be as follows: Division, a relatively permanent trade designation for a particular stock; Stock, the letter designation for a stock; Close, the price at which a stock closed on the previous day; Open, the price at which a stock opened on the current day; High, the highest price quoted for a stock during the current day; Low, the lowest price of a stock for the current day; Quantity, the quantity of stock sold under the transaction of the accompanying quotations, this display being relatively momentary; and Last, the price of the last sale of a particular stock.

In Fig. 14B are shown enlarged views of margin or style space 1601 and of stock space 1301, which are typical of the spaces of the board shown in Fig. 14A. In each stock space there are provided six horizontal levels which will be referred to for convenience as shelves. Each of these shelves is divided vertically into four spaces so that in each stock space there may be substantially twenty-four windows or indicating spaces. For each of these windows there is provided an indicating or display drum which may be revolved about a vertical axis. The outer or peripheral faces of the drums are provided with characters or numerals for display through the windows. For the spaces Close, Open, High, Low and Last each of the drums for the three windows from the left carries 11 spaces arranged to present the numerals 1, 2, 3, 4, 5, 6, 7, 8, 9, 0 and one blank face while the drums in the right hand space are provided with eight spaces to display numerals 1, 2, 3, 4, 5, 6, 7 and one blank. For each of these five shelves, which may be referred to as the price shelves, the right hand space corresponds to fractions, the next space to the left units, the third to tens and the left hand space to hundreds. In stock quotations the fractions of the price are always in eighths. Therefore, the numerals on the fractions indicating drums correspond with the numerator only, the denominator of the fraction being omitted, and these drums are distinguished from others by using a different color combination. The spaces in the shelf Quantity serve for the display of the number of shares of stock involved in a transaction when that number is one hundred or more. Therefore, for this indication only three of the spaces are used, the right hand space being left blank. The second space from the right corresponds with hundreds, the third with thousands and the extreme left hand space with tens of thousands. The drums used for quantity indications carry numerals 1 to 9 and zero together with one blank face.

In Figures 12 and 13 there are shown four groups of indicator dials or drums, designated 1041 to 1063, 1071 to 1093, 1141 to 1163 and 1171 to 1193, together with the vertical shafts which serve as bearings for them. The shafts are so positioned that the various indicator drums are flush with the board and fit closely into the board face. The drums 1141 to 1163 and 1041 to 1063 serve different horizontal levels within one vertical section or bay of the board. Drums 1071 to 1093 and 1171 to 1193 serve two horizontal levels within another vertical section or bays of the board.

For convenience the shafts 1211 to 1213 are shown off-set in the drawings; actually they are to be assembled so that the drums associated with them align with the drums associated with shafts 1214 to 1216, also shafts 1231 to 1233 are to be arranged so that the drums associated therewith align with the drums associated with shafts 1234 to 1236. In Figure 14B within space 1301 reference characters 1141 to 1163 have been entered in the respective window spaces to indicate the location of the correspondingly marked display drums of Figure 13.

In association with the display drums, there is provided a system of operating magnets 1011 to 1019 for drums 1041 to 1063, magnets 1031 to 1039 for drums 1071 to 1093, magnets 1111 to 1119 for drums 1141 to 1163 and magnets 1131 to 1139 for drums 1171 to 1193. In setting a drum for a predetermined display, the associated operating magnet is selected and energized at the same time that the associated common shaft is selected and effected to turn so that a boss or pin thereon may take up the desired position which has been selected. Due to the action of the operating magnet a cam rigidly fixed to the display drum is made to bear on the shaft boss thereby rotating the drum to bring the desired character before the window in the display board. This drum setting mechanism by which the dials of each group may be set to predetermined positions is disclosed in my application for an Automatic Stock Quotation Display Board, Serial Number 382,286, filed July 30, 1929, Patent No. 2,145,032, January 24, 1939.

Proceeding now with the description from the moment the selector switches 831 to 889 were positioned on their first contact points under the effects described for the third and fourth groups of impulses, the circuits thus chosen corresponding with what is termed a stock selection. In the present instance, this will be, as was indicated, a double letter stock and for convenience of description it will be assumed that the space selected is the one numbered 1301 (Figs. 14A and 14B).

The remaining eight cycles of impulses of the quotation will determine just what changes will take place within the space 1301 where the quotation is to be displayed.

The fifth and next cycle of impulses from the line serves for selecting a certain one of the four shelves Close, Open, High or Low within the space 1301. This is for the reason that while the price of each transaction is invariably made to appear on the lower-most shelf labeled Last, it may also be made to appear simultaneously, if required, on either one of the four shelves above the quantity shelf. Whenever a transmission requires the latter appearances, the operation is termed "shelf-selection." When the start impulse of the fifth group of impulses is received the distributor brush arm 16 is again released causing off-normal contacts 22 to transfer ground from conductor 25 to conductor 26. Relay 71 is released and relay 73 immediately operated thus connecting distributor bus conductors 27, 28, 29, and 30 to recording relays 74, 75, 76 and 77 respectively. The single selective impulse received over the line causes relay 74 to respond and lock through its left hand winding, contact A, conductor 203 and contact A of operated relay 201 to ground. The distributor revolution being complete ground is transferred from conductor 26 back to conductor 25, which causes relay 72 to release. Relay 73 then also releases. A circuit is now completed from ground over contact E of relay 73, contact B of relay 74, conductor 174, contact B of relay 700, contact B of relay 800, conductor 819, contactor arm and first contact segment of selector switch 849, contactor arm and first contact segment of selector switch 869, conductor 1109 and winding of operating magnet 1119 to battery. Magnet 1119 is of suitable "gang" type to simultaneously depress the four drums 1160 to 1163, consequently when it responds the four drums are rotated (as disclosed in the above-mentioned co-pending application) to show their blank faces, since at this time the shafts 1211 to 1213 are in their normal positions. Thus the closing price for the previous day will be removed slightly in advance of recording the closing price for the current day, which recording will shortly be described.

The sixth, seventh and eighth groups of impulses control indicators on the Quantity shelf in the selected stock space 1301 as will now be described.

Upon reception of the start impulse the off-normal contacts 22 of the distributor cause the release of relay 221, and the resultant operation of relay 223. The first selective impulse of the sixth group then causes relay 224 to lock through its winding, and locking contacts A, conductor 203 and contact A of relay 201. Subsequently, when the off-normal contacts 22 remove ground from conductor 26, mate relay 222 releases, causing relay 223 to release. Ground potential over contact E of relay 223 is applied to contacts B and C of relay 224. Ground potential over contact B of relay 224 and conductor 524 operates code setting magnet 901, while ground over contact C of relay 224, conductor 528, contacts K of relays 700 and 800, conductor 815, contactor arm and first contact segment of selector switch 845, contactor arm and first contact segment of selector switch 865 and conductor 1105 energizes operating magnet 1115 (Fig. 13).

In Figure 11 a main shaft 980 driven by motor 620 is connected by means of a system of gearing and associated slip clutches 909, 919, 929, 939, 949, 959 and 969 to rotate lateral shafts 910, 920, 930, 940, 950, 960, and 970 respectively. Gears 1201 to 1207 (Fig. 12) connect the latter shafts respectively to the group of vertical shafts 1211 to 1217 which extend through and serve one bay of the quotation board; gears 1221 to 1227 connect another group of vertical shafts 1231 to 1237 which serve another bay; all to be driven from the seven lateral shafts.

For the shaft 910 there is provided a group of four code setting magnets 901 to 904 and code discs 905 to 908 to form a code selective assembly similar to those shown in Fig. 3 and already described. In the code setting assemblies of Fig. 11, however, retractile springs have been provided in place of reset magnets for returning the discs to their normal positions.

When magnet 901 is energized, as described, shaft 910 is released to rotate until stopped by a code member (not shown) which is set by this magnet. Thus the vertical shaft 1211 will be rotated to a position one point off normal. Since, as explained, magnet 1115 is energized, each of the drums 1145, 1146 and 1147 is affected by the boss or pin on the associated shafts 1213, 1212, 1211 so that while drum 1147 will be revolved to display the numeral 1, the drums 1146 and 1145 will be rotated to their normal or blank position in removing a previous setting.

Upon reception of the seventh group of impulses from the line, relay 231 (Fig. 6) releases and relays 233 and 234 operate, the latter relay locking through its winding and contacts A to the grounded conductor 203. When mate relay 232 is released in the usual manner, relay 233 is de-energized, whereupon ground potential is connected over contact E of relay 233, contact B of relay 234 and conductor 534 to energize code setting magnet 911 (Fig. 11). Due to this selection on the code setting assembly 915—918 vertical shaft 1212 is rotated to its first selective point. Thus under the existing pressure of operating magnet 1115, drum 1146 will be rotated to display its numeral 1. The bus conductor 528 from which ground potential for energization of operating magnet 1115 is supplied is connected in common to contacts C of the three groups of recording relays 224—227, 234—237 and 244—247 so that magnet 1115 will be energized whenever one of the storage relays of the three groups mentioned is operated.

When the start pulse of the eighth group of impulses is received over the line, relay 241 (Fig. 6) releases and relay 243 operates. The reception of the first selective pulse operates relay 244 which locks through its locking contacts A and the grounded conductor 203. Then ground potential over contacts E of relay 243, contacts B of relay 244 and conductor 544 energizes code setting magnet 921. Vertical shaft 1213 is rotated to its first off-normal point and drum 1145 displays the numeral 1, since as explained magnet 1115 is still operated due to application of ground potential to conductor 528. Release of relay 242 effects disconnection of relay 249, since the holding circuit of that relay through contacts C of relay 222, B of relay 232 and A of relay 242 is finally opened by the release of relay 242. Release of relay 249 disconnects the locking circuit of the next translation control relay 251. Relay 201 is now retained jointly by relays 252, 262, 272 and 282.

Due to the operations just described the quantity of the particular sale under consideration has been received and registered as 111 on the shelf labeled Quantity in space 1301 (Fig. 14B).

The operations next to be described concern the price of the stock for the sale considered and are transmitted by the last four impulse groups.

The ninth group of impulses causes release of relay 251. Immediately upon this release relay 253 operates, and as before, connects the distributor bus conductors 27, 28, 29 and 30 to respective recording relays 254, 255, 256 and 257. The first selective impulse of the ninth group then causes relay 254 to operate. Relay 254 then locks over its own locking contacts A to the grounded bus conductor 203. Following this relays 252 and 253 release and ground potential is applied over contact E of relay 253, contact B of relay 254 and conductor 554 to energize code setting magnet 931 (Fig. 11). Ground potential is also applied over contact E of relay 253, contact C of relay 254, conductor 558, contacts M of relays 700 and 800, conductor 814, contactor arm and first contact segment of selector switch 844, contactor arm and first contact segment of selector switch 864, and conductor 1104 to energize operating magnet 1114 associated with drum 1144 (Fig. 13). Thus, coincident with rotation of shaft 1214 to its first off-normal point under control of magnet 931, the drum 1144 will be set to display the numeral 1 in the hundreds place of the quotation.

Upon reception of the start impulse of the tenth group of impulses relay 261 releases and relay 263 operates, connecting the distributor bus conductors to the group of recording relays 264 to 267. The first selective impulse is received and operates relay 264 which locks due to the circuit over its locking contacts A to the grounded conductor 203. Relays 262 and 263 are released, due to the return of the distributor brush arm and off-normal contacts 22 to their normal positions. Ground potential is applied over contact E of relay 263, contact B of relay 264 and conductor 564 to energize a code setting magnet 941 (Fig. 11). Ground potential is also applied over contact E of relay 263, contact C of relay 264, conductor 568, contact O of relays 700 and 800, conductor 813, contactor arm and first contact segment of selector switch 843, contactor arm and first contact segment of selector switch 863 and conductor 1103 to energize operating magnet 1113 (Fig. 13). These operations result in the movement of shaft 1215 to set the drum 1143 to display the numeral 1 in the position corresponding with the tens value of the quotation.

When the start impulse of the eleventh group is received relay 271 is caused to release. Thereupon relay 273 operates and connects the distributor bus conductors to the recording relays 274—277. Reception of the first selective impulse then causes relay 274 to operate. This relay then locks to bus conductor 203. Relays 272 and 273 release; ground potential thus being applied over contact E of relay 273, contact B of relay 274 and conductor 574 to energize code setting magnet 951 (Fig. 11). Ground potential is also applied over contact E of relay 273, contact C of relay 274, conductor 578, contacts Q of relays 700 and 800, conductor 812, contactor arm and first contact segment of selector switch 842, contactor arm and first contact segment of selector switch 862 and conductor 1102 to energize operating magnet 1112 (Fig. 13). Under these effects shaft 1216 will be rotated to a position one point off normal and drum 1142 moved to display the numeral 1 in the units place of the quotation.

The start pulse of the twelfth and last group of impulses causes release of relay 281. Thereupon relay 283 operates and connects the distributor bus conductors to the recording relays 284—287. The reception of the first signal pulse of the group operates relay 284 which locks to the grounded bus conductor 203. Relays 282 and 283 release, due to the completion of the revolution of the distributor, and ground potential over contact E of relay 283, contact B of relay 284 and conductor 584, effects response of code setting magnet 961 (Fig. 11). Ground potential is also applied over contact E of relay 283, contact C of relay 284, conductor 588, contacts S of relays 700 and 800, conductor 811, contactor arm and first contact segment of selector switch 841, contactor arm and first contact segment of selector switch 861 and conductor 1101 to energize operating magnet 1111. This in cooperation with rotation of shaft 1217 positions display drum 1141 to display the numeral 1 in the fractions place of the quotation under consideration.

Since operating magnet 1119 stood operated during reception of the last four groups of impulses, drums 1160 to 1163 were rotated simultaneously with drums 1141 to 1144. Therefore the price indicated on the last shelf will also be shown on the Close shelf and will be in the present instance 111⅛. On the Quantity shelf there will be, during a limited period, a display 111 corresponding with 11,100 as the number of shares concerned in the transaction.

During the period when ground potential is applied to bus conductor 203 the several recording relays 74, 224, 234, 244, 254, 264, 274, 284 and the relays 204, and 205 will continue operated. In order to insure against premature release of these relays, a relay 206 (Fig. 11) is arranged to continue ground on conductor 203 until the display control operations have been completed. Relay 206 is supplied with ground potential for energizing its winding through conductor 207 which is connected common to contacts associated with contactor wheels 1064 to 1070 (Fig. 11). These contactor wheels correspond to the wheels 327 and contacts 328 shown and described in connection with Fig. 3 and are arranged in parallel so that ground continues to be applied to the winding of relay 206 so long as any one of the shafts 910 to 970 is in motion. Therefore, following release of relay 282 as already described relay 201 releases but this is without effect as relay 206 will have operated and due to the slow-release characteristics of this relay, ground to conductor 203 is continued for an appreciable period following cessation of motion of the last shaft under rotation in completing the reception of the quotation. When relay 206 finally releases, the alternate or substitute ground over contact B of that relay is finally removed from conductor 203. The removal of this ground effects release of relays 74 (Fig. 5) 224, 234, 244 (Fig. 6) 254, 264, 274, 284 (Fig. 7), 204 and 205 (Fig. 6), the release of these relays in turn causing release of operating magnets 1111, 1112, 1113, 1114 and 1119 (Fig. 13).

This also releases code setting magnets 901, 911, 921, 931, 941, 951 and 961 (Fig. 11). Release of the latter magnets permits the restoration of the code discs 905, 915, 935, 945, 955 and 965 to normal, under the action of the associated retractile springs. When these code discs return to normal the selected code pins are withdrawn and the normal code pins enter the slots of the code discs. All code setting shafts are thus allowed to rotate to their normal position. Since the operating magnets 1111 to 1114 and 1119 have already released, the movement of the shafts is without effect on the associated indicating drums 1141 to 1147 and 1160 to 1163, so that the indications present on the Close, Quantity and Last shelves will continue to be displayed.

During the rotation of the several shafts to normal the contactor wheels 1064 etc. (Fig. 11) close ground potential to energize relay 206 (Fig. 11). Ground is then applied over the contacts of relay 206 to conductor 203; a path for current flow through the windings of relays 204 and 205 is established and these relays operate. Due to its slow-to-release characteristics relay 206 will continue operative momentarily after its disconnection due to the cessation of motion of the shafts, after which it will release and disconnect relays 204 and 205. Release of relay 205 will occur immediately while release of relay 204 will be delayed momentarily due to its slow-to-release characteristics. Thus a circuit is momentarily set up over the contacts of relay 204, contacts of relay 205, conductor 528, contacts K of relays 700 and 800, conductor 815, contactor arm and first contact segment of selector switch 845, contactor arm and first contact segment of selector switch 865 and conductor 1105 to quantity operating magnet 1115 (Fig. 13). Since all shafts are now in their normal positions this momentary energization of magnet 1115 will cause drums 1145 to 1147 to be rotated to display their blank faces, thus removing the quantity indication from the board. Immediately following this operation, relay 204 releases and thereby disconnects operating magnet 1115, thus bringing the last of the circuits to normal condition.

If it is desired to maintain the quantity displayed on the indicators until the next quotation involving a new quantity, all that is required is to eliminate relays 204 and 205 and the connections thereto.

When relay 201 released, following reception of the 12th and last cycle of impulses of the assumed quotation ground potential over contacts B of that relay and conductor 202 causes the cycle of operations first described comprising response of relays 31, 32, 41, 42 to be repeated thereby preparing the system for reception of a subsequent quotation.

The above describes the reception and posting of a quotation for one of the 225 double letter stocks. A similar reception and posting for a second double letter stock will be briefly described in order to show the manner of selecting any one of said group.

Let it be assumed that the code for the particular stock now to be considered is the same as that previously used except that the second impulse rather than the first impulse of the third group is to be employed. In this case relay 55 rather than relay 54 will respond during reception of the third group of impulses. A path for ground potential will then be completed over contact E of relay 53, contact B of relay 58, contact B of relay 55 and conductor 155 to energize code setting magnet 692. Thus code disc 606 will be shifted to permit the second pin 612 to be set for intercepting arm 609 fixed to shaft 616. Therefore, movement of the associated shafts will cease when the contactor arms of dial selector switches 831 to 849 have reached their second contact segments. Since the second contact segments of these switches connect respectively to the contactor arms of the nine selector dial switches 871 to 879, from the first segments of which conductors 1121 to 1129 extend to operating magnets 1131 to 1139, it follows that selections may now be made in the latter group of magnets rather than in the group 1111 to 1119 as under the first assumed quotation. For the present quotation energization of magnets 1131 to 1135 and 1139 is had successively coincident with energization of code setting magnets 901, 911, 921, 931, 941, 951 and 961 to result in shifting the drums 1171 to 1177 and 1190 to 1193 to display the digits 1 as under the first quotation described. Following this, the circuits will automatically be conditioned to await a subsequent quotation in a manner similar to that already described.

The foregoing describes the operation of the board during the posting of quotations for double letter stocks. As explained previously the capacity of the board has been extended by switching arrangements to care for additional stocks designated as single letter stocks; these single letter stocks being divided into two groups, termed single letter odd and single letter even stocks. The switching arrangements referred to consist of the relays 700 and 800 (Fig. 8), relay 800 being associated with the single letter odd group and relay 700 with the single letter even group of stocks.

A description will now be given of the reception, translation and display of a single letter odd stock quotation. For the purposes of this description it will be assumed that the quotation is the same as that already described for the double letter stock, the single exception being that due to the fact of its being a quotation for a single letter stock but eleven signal impulse groups will be required in place of twelve. In order to effect the omission of this one impulse group it is necessary that one of the other groups, the second, utilize the second impulse instead of the first. In each of the other impulse groups, however, the first selective impulse will be used.

Upon reception of the first group of impulses the group of relays 31 to 40 will be acted upon to set code disc 305 so that the contactor arms of nominating dial switches 331 to 340 will be positioned on their respective first contact segments in the manner already described.

Upon reception of the second group of impulses, relays 41 to 48 will be affected as before with the exception that due to reception of the second instead of the first selective impulse of the second group, relay 45 will operate instead of relay 44. Ground potential over contact E of relay 43, contact C of relay 46, contact B of relay 45 and conductor 145 serves to energize code setting magnet 342 (Fig. 3). Code disc 346 is then moved and shaft 356 allowed to advance until arm 349 meets pin 352 which has been interposed in its path. This movement of shaft 356 moves the contactor arms of nominating dial switches 371 to 400 to their respective second contact segments. The method of wiring between the two groups of nominating dial switches 331 to 340 and 371 to 400 is such that a number of parallel paths is now established from conductor 70. These paths are: contactor arm and first contact segment of nominating dial switch 331, contactor arm and second contact segment of nominating dial switch 371, conductor 411, and winding of relay 51; contactor arm and first contact segment of nominating dial switch 333, contactor arm and second contact segment of nominating dial switch 373, conductor 413 and winding of relay 71; contactor arm and first contact segment of nominating dial switch 334, contactor arm and second segment of nominating dial switch 374, conductor 414 and winding of relay 221; contactor arm and first contact segment of nominating dial switch 335, contactor arm and second contact segment of nominating dial switch 375, conductor 415 and winding of relay 231; contactor arm and first contact segment of nominating dial switch 336, contactor arm and second contact segment of nominating dial switch 376, conductor 416 and winding of relay 241; and similar paths from conductor 70 to each of the relays 251, 261, 271 and 281. Application of ground to conductor 70 in the same manner as was previously described, now causes translation control relays 51, 71, 221, 231, 241, 251, 261, 271 and 281 to operate. It will be noted that translation control relay 61 did not respond. This is due to the fact that its parallel circuit is not completed at nominating dial switch 372 on which switch the second contact segment has been left vacant in order to achieve the present selective condition. Upon response of the translation control relays as indicated the respective mate relays 52, 72, 222, etc. also operate.

Upon reception of the third group of impulses the group of relays 51 to 58 effect shaft 616 to advance the contactor arms of selector switches 831 to 839 and 841 to 849 to their respective first contact segments. The movement of shaft 616 causes off-normal contacts 622 to be opened and off-normal contacts 621 to be closed (Fig. 8). Ground potential is thus applied over off-normal contacts 632 and contacts 621 to energize relay 800. The operation of relay 800 transfers conductors 174, 175, 176, 177, 528, 558, 568, 578 and 588 from conductors 819 to 811 to conductors 829 to 821 respectively. Conductors 821 to 829 connect to the contactor arms of selector switches 831 to 839 respectively. The leads 1001 to 1009 from the respective first segments of the latter switches connect to operating magnets 1011 to 1019. Thus by the operation of relay 800 without operation of relay 700 the operating magnets 1011 to 1019 are substituted for magnets 1111 to 1119.

Reception of the fourth group of impulses is effective on relays 71 to 77 since, as above described, the nominating effects have rendered relays 61 to 67 inoperative. Thus the first selective impulse of this group causes relay 74 to operate. Ground potential is then applied over contact E of relay 73, contact B of relay 74, conductor 174, contact B of relay 700, contact A of relay 800, conductor 829, contactor arm and first contact segment of selector switch 839 and conductor 1009 to energize operating magnet 1019 which serves the Close shelf of the present selected single letter odd stock.

The last eight cycles of impulses, four to eleven, are next received and translated in the same manner as the last eight impulses of the double letter stock quotation described previously. Due to the operated position of relay 800, however, the indications will be set up on the group of display indicators 1041 to 1063, instead of 1141 to 1163 as before.

The reception, translation and display of a stock in the single letter even group takes place in a manner very similar to that described in connection with that for a single letter odd stock. Reception of a quotation for a single letter even stock will now be considered. The quotation assumed in describing this operation will be the same as that used as an example throughout the preceding material, the quotation being posted as 111⅛ on the Close shelf, 111 on the Quantity shelf and 111⅛ on the Last shelf.

Upon reception of the first group of impulses the group of relays 31 to 40 will be acted upon to set code disc 305 so that the contactor arms of nominating dial switches 331 to 340 will be positioned on their respective first contact segments in the manner already described.

In this case the third impulse of the second group of impulses is utilized, consequently when the second group of impulses is received relays 41 to 48 will be affected as before with the exception that relay 46 will be operated rather than relay 45 as in the case of single letter odd stock selection or 44 as in the double letter selection. Thus ground potential over contact E of relay 43, contact D of relay 48, contact B of relay 46, and conductor 146 serves to energize code setting magnet 343 (Fig. 3). Code disc 347 is then moved and shaft 356 allowed to advance until arm 349 is stopped by pin 353 which has been interposed in its path. This movement of shaft 356 moves the contactor arms of selector switches 371 to 400 to their respective third contact segments. The wiring between the two groups of selector switches 331 to 340 and 371 to 400 is such that a number of parallel paths is now established from conductor 70. These parallel paths are: contactor arm and first contact segment of nominating dial switch 332, contactor arm and third contact segment of nominating dial switch 372, conductor 412, and winding of relay 61; contactor arm and first contact segment of nominating dial switch 332, contactor arm and third contact segment of nominating dial switch 373, conductor 413 and winding of relay 71; and similar paths from conductor 70 to each of the relays 221, 231, 241, 251, 261, 271 and 281. Application of ground to conductor 70 in a manner already described causes relays 61, 71, 221, 231, 241, 251, 261, 271 and 281 to operate.

It is to be noted that in this case translation control relay 51 did not respond as its operating circuit was open at nominating dial switch 371 on which switch the third contact segment has been left vacant in order to bring about the present selective condition. When the nine translation control relays indicated operate, their mate relays 62, 72, 222, 232 etc. are in turn operated.

The first impulse only of the third group is received. Consequently, the reception of this group causes relays 61 to 68 to operate, since relays 51 to 58 have been rendered inoperative due to the nominating effects described above. Operation of relays 61 to 68 allows shaft 656 to advance the contactor arms of selector dial switches 851 to 859, 861 to 869, 871 to 879 etc. to their respective first contact points. Movement of shaft 656 causes off-normal contacts 632 to be operated. Since shaft 616 has remained stationary, contacts 621 and 622 are unaffected. Consequently, a circuit is set up over off-normal contacts 632 and off-normal contacts 621 to operate relay 700. Operation of relay 700 transfers conductors 174, 175, 176, 177, 528, 558, 568, 578 and 588 from leads 819 to 811 to leads 719 to 711 respectively. Conductors 711 to 719 connect to the contactor arms of selector dial switches 851 to 859 respectively. The leads 1021 to 1029 from the respective first segments of the latter group of switches connect to operating magnets 1031 to 1039 respectively. Therefore operation of relay 700 unaccompanied by operation of relay 800 causes substitution of operating magnets 1031 to 1039 for magnets 1011 to 1019.

Reception of the fourth group of impulses causes operation of relays 71 to 77 since, as explained above, the nominating effects have rendered relays 51 to 59 inoperative. The first selective impulse of the fourth group causes relay 74 to operate. Ground potential is applied over contact E of relay 73, contact B of relay 74, conductor 174, contact A of relay 700, conductor 719, contactor arm and first contact segment of selector switch 859 and conductor 1029 to energize operating magnet 1039 which serves the Close shelf of the present selected single letter even stock.

The last eight cycles of impulses, four to eleven, are next received and translated in the same manner as the last eight impulses, five to twelve of the double letter stock quotation. Due to the operated position of relay 700, however, the indication will be displayed by the group of indicators 1071 to 1093 rather than 1141 to 1163 as for the double letter stock.

It very frequently happens that successive quotations are for the same stock. As was indicated previously, a means is provided for reducing the number of groups of received signals required to a minimum. In order to show the means for accomplishing this, let it be assumed that the last quotation received, which was set up on indicators 1071 to 1093, is to be changed in the fractions place of the last price only. Assume the change desired to be from 111⅛ to 111⅜. In order to effect this change only three groups of received signals will be required.

During the reception of the first group the first impulse only will be received. Relays 31 to 40 and code setting devices 305 to 308 will be so effected that the contactor arms of nominating dial switches 331 to 340 will be set on their respective first contact points.

Then in order to nominate that the indication in the fractions place only of the last price be changed it is necessary to send the fourth pulse of the second group. Therefore, the fourth storing relay 47 will operate and lock. Ground potential will then be applied over contacts E of relay 43, contact C of relay 48, contact B of relay 47 and conductor 147 to energize code setting magnet 344. Code disc 348 will then be positioned so that the fourth stop pin 354 will be positioned to arrest and retain the shaft system at a point such that contactor arms of nominating dial switches 371 to 380 will be positioned on their respective fourth contact points. Ground potential will be applied to conductor 70, contactor arm and first contact segment of selector switch 340, contactor arm and fourth contact segment of selector switch 380, and conductor 420 to energize relay 281. Operation of relay 281 causes operation of its mate relay 282 which in turn applies ground to the winding of relay 201 to retain it, which application of ground to the winding of relay 201 takes place an instant before the release of relay 42 at the conclusion of the reception of the second group of impulses and the consequent release of relays 49, 69, 229, 239, has progressed to the point of disconnecting relay 201. Due to vacancies on the fourth contact segments of nominating dial switches 371 to 379 the conductors 411 to 419 remain open with the result that the associated translation control relays 51, 61, 71, 221, 231, 241, 251, 261, and 271 remain inoperative. Lack of response of the translation control relays 51 and 61 prevents operation of relay 50 so that conductors 159 and 160 remain open and restoring magnets 721 to 724 and 731 to 734 will be unaffected at this time. Therefore, the equipment of Figs. 9 and 10 will be unaffected at this time and will continue effective for the stock previously set up, under which condition contactor arms of selector dial switches 831 to 839 and 841 to 849 are positioned on their respective first contact points.

Since no translation control relays other than 281 have been operated the next or third impulse group becomes effective on the last group of recording relays 284 to 287. In order to effect the change from 1/8 to 2/8 the second impulse of this third group is received, causing operation of relay 285. Ground potential is now applied over contact E of relay 283, contact B of relay 285 and conductor 585 to energize code setting magnet 962 (Fig. 11). Under stress of the slip clutch 969 shaft 970 moves to the second off-normal point. At the same time that ground potential is thus applied to magnet 962 it is also applied over contacts E of relay 283, contacts C of relay 285, conductor 588, contact R of relay 700, conductor 711, contactor arm and first contact segment of switch 851 and conductor 1021 to energize operating magnet 1031. These operations result in rotation of the fractions drum 1071 to display the numeral 2 which corresponds with the desired fraction 2/8. On the shelf Last where this change appears the units drum 1072, tens drum 1073 and hundreds drum 1074 are unaffected and, therefore, remain in the position in which they were set under the quotation for the single letter even stock. Thus the last price now displayed is 111 2/8. Following the operation just described the various equipments, except the stock selector switches of Figures 9 and 10, will restore and relays 31 and 41 will again be operated in preparation for the reception of a subsequent quotation.

From the illustrations of the operation of the board given above it is apparent that the first two groups of impulses which respectively control the two groups of nominating control and storage relays 31—40 and 41 to 48, will always be of such character as to determine whether the equipment of Figure 3 shall condition for the response of the translation control relays 51 and 61. Also, the operation of the devices of Figure 3, by controlling the circuits to the remaining eight translation control relays, nominate or predetermine which qualities of the stock later selected shall be displayed. The principal object of the nominating operations is to eliminate all unnecessary transmission.

To express in general terms that which has up to now been given in the form of illustration: According to coding of the first group of impulses, the A group of code devices of Fig. 3 effects a choice of any one of fifteen contact points on the ten nominating dial switches 331 to 340. In turn a second group of impulses controls the code setting devices of Fig. 3 designated B to cause fifteen different groups of nominating dial switches as switches 371—380, 381 to 390 etc. to choose any one of their fifteen different contact points. Under the plan of connections shown, the respective contact points of the switches in the first or primary groups 331 to 340 connect to respective contactor arms of the respective groups of nominating dial switches 371 to 380, 381 to 390, 391 to 400 etc. As shown, the conductors 411 to 420 are branched to serve contact segments on the latter switches according to a desired pre-determined order, which may of course be varied as desired in different situations. Therefore, a suitable number of permutative effects may be had to carry out selections among the ten translation control relays 51, 61, 71, 221, 231, 241, 251, 261, 271, and 281. Only three of the fifteen groups of nominating dial switches have been shown but it is to be understood that the additional twelve may be added and arranged for operation by shaft 360 while the contact points may be predeterminately interconnected to the common conductors 411—420 in the same manner as is shown for the first three groups. Each of the ten translation control relays is associated with a definite board function, so that its operation or non-operation in accordance with the nominating cycles determines whether a particular item of information concerning the stock is to be indicated or not, and also in which group of stocks the received quotation will become effective.

Thus, if translation control relay 61 operates and translation control relay 51 does not the stock subsequently to be selected will lie in the group designated as single letter odd; if relay 51 operates and relay 61 does not the stock to be selected will lie in the group designated as single letter even; if both relay 51 and relay 61 operate the stock to be selected will lie in the double letter group; if neither relay 51 nor relay 61 operates the stock selected for the previous quotation will remain selected; also, if relay 71 operates the indicator dials, or some of the indicator dials, on one of the shelves High, Low, Open or Close are to be affected, in addition to effects which always occur on the Last shelf; if relay 221 operates a change is to occur in the ten thousands place of the Quantity shelf; if relay 231 operates a change is to take place in the thousands place of the Quantity shelf; if relay 241 operates a change will occur in the hundreds place of the Quantity shelf; if relay 251 operates a change is to be made in the hundreds place of the Last shelf; if relay 261 operates a change is to be made in the tens place of the Last shelf; if relay 271 operates a change is to be effected in the tens place of the Last shelf and if relay 281 operates a change will occur in the fractions place of the Last shelf.

The third group of impulses will become effective, therefore, on the group of circuits controlled by the first operated relay of the group 51, 61, 71, 221, 231, 241, 251, 261, 271 and 281.

If relay 51 has been operated the third group of impulses will affect the code devices of Fig. 8A to place the contactor arms of two groups of selector dial switches 831 to 839 and 841 to 849 on any one of their respective fifteen contact points. Relay 800 will be energized to transfer the selection control leads from switches 841 to 849 to switches 831 to 839, which switches serve the group of stocks designated as single letter odd. One of the fifteen stocks in the single letter odd group is selected at this time, depending on which contact segment the contactor arms of the switches have come to rest. The third group of impulses is then, when relay 51 is operated and relay 61 is not, the stock selection group.

If relay 61 has been operated while relay 51 has not the third group of impulses will determine the stock selection from a group of single letter even stocks associated with switches 851 to 859 to which switches the selector control leads will be transferred by operation of relay 700.

If relays 51 and 61 have both been operated both the third and fourth groups of impulses will be required to effect a stock selection, the selection being made through the use of stock selection switches 841 to 849 and 861 to 869, 871 to 879, etc. In order to simplify the drawings but three groups of secondary stock selector switches 861 to 869, 871 to 879 and 881 to 889 have been shown. The order of arranging and connecting the remaining twelve groups would be the same as that shown for the three groups mentioned. Each group of nine secondary stock selector switches as 871 to 879 serves fifteen different stocks, the manner of interconnecting the fifteen contact points of the nine primary stock selection switches 841 to 849 to respective groups of nine secondary stock selector switches making it clear that a selective capacity of 225 stocks is had, also by employing relays 700 and 800 thirty additional selections are procured making the total number of selections 255.

If neither relay 51 nor relay 61 has been operated the third group of impulses will become effective on relay 71, the fact that neither relay 51 or 61 has been operated determining that the stock selection of the previous quotation shall remain effective. Thus it will be seen that the third, fourth, or fifth group of impulses may become effective on relay 71 if that relay has been operated. Any group which becomes effective on relay 71 determines which of the four price shelves High, Low, Open or Close any subsequent price selection may become effective upon.

Any of the impulse groups 3 to 6 may become effective on relay 221 and will determine, through the selectable setting of code magnets 901 to 904 and shaft 910, what indication is to appear in the hundreds place of the Quantity shelf.

In a similar manner any impulse group from 3 to 7 may become effective on relay 231 and determine the indication in the tens place of the Quantity shelf.

Likewise any impulse group from 3 to 8 may become effective on relay 241 and determine the indication in the units place of the Quantity shelf.

Any impulse group from 3 to 9 may become effective on relay 251 and determine the indication in the hundreds place of the Last shelf and also of any other price shelf which was selected, such as High, Low, Open or Close. Similarly any impulse group from 3 to 10 may become effective on relay 261 and will determine the indication in the tens place of the price indication; any impulse group from 3 to 11 may become effective on relay 271 and will determine the indication in the units place and any impulse group from 3 to 12 may become effective on relay 281 and will determine the indication in the fractions place of the price indication.

In the drawings there are shown but two groups of twenty-three indicating drums. Since the full capacity of the board, under the four unit code basis, is 255 stocks it is obvious that provision must be made for 255 groups of twenty-three indicating drums. The shaft arrangements would be such as to conform to the desired physical dimension of the board, one such arrangement, for example, comprising seventeen groups of vertical shafts each serving fifteen groups of indicating drums.

In this connection it should be noted that while the quantity determining shafts 910, 920 and 930 and the price control shafts 940, 950, 960 and 970 are common through the entire quotation board, the selection of a particular stock rests entirely with the operating magnets associated with that stock.

It is quite obvious that if it is desired to post other pertinent information on the board, such as money rate, sales volumes, etc. one of the stock spaces may be used for this purpose, the operation being the same as for a stock quotation and the different headings being written in.

Although the four unit code basis has been employed throughout the foregoing description it will be seen that the circuits and equipment may readily be arranged for control upon a five unit basis, thereby extending the capacity from 225 plus 30 stocks to 961 plus 62 or 1023 stocks, since the total number of permutations for a four unit code is 15, while for a five unit code this number is increased to 31.

In order to employ the five unit code, five selective segments would be required in place of four on the receiving distributor of Fig. 1. Also an additional impulse storing relay would be required in each one of the groups of impulse storing relays 54 to 57 and 64 to 67 and an additional code disc and control magnet therefore would be required for the code setting groups 605 to 608 and 645 to 648 (Fig. 8) while the primary and secondary stock selector switches 831 to 839, 841 to 849, 851 to 859, 861 to 869, 871 to 879 etc. would each have thirty-one contact segments. The total number of secondary stock selector switches would be thirty-one instead of fifteen as for the four unit code basis. In all other respects the equipment would be the same as that shown in the drawings.

As shown, the various groups of dials are mounted on drive shafts schematically illustrated and the shafts are shown connected by bevel gears and slip clutches. In actual practice spiral gears and commercial friction clutches may be employed.

As the schematic illustrations and the accompanying specification are merely to facilitate a comprehensive understanding of the system disclosed the invention is to be construed as broadly as the state of the art and the appended claims permit.

I claim:

1. In a stock quotation system, a stock quotation board having a plurality of stock display units, each unit having a plurality of quantity display indicators, an operating magnet for each unit and common to the indicators thereof, a shaft individual to each indicator, means for positioning any of said indicators when the movement of the shaft individual thereto concurs with the energization of the associated operating magnet, a plurality of code selective devices, each for positioning a corresponding shaft, a plurality of selective circuits each for positioning a corresponding code selector device, a selective circuit common to said operating magnets, stock selecting means for extending said common selective circuit to the operating magnet of a predetermined unit, a plurality of storage relay groups for selectively operating said code selective devices and for completing said common selective circuit, and a distributor for selectively operating said storage relays.

2. In a stock quotation system, a distributor, a plurality of groups of storage relays, means for invariably connecting said distributor to some of said storage relay groups, means for selectively operating the relays in said invariably connected groups in accordance with impulses received by said distributor, a plurality of switches, a code selector device operable in accordance with the energization of the relays in said invariably connected groups for variably positioning said switches, means responsive to the positioning of said switches for predetermining which of the remaining storage relay groups are to be connected to said distributor, and means thereafter operable for restoring said switches, said code selector device and said energized storage relays.

3. In a stock quotation system, the combination of a stock quotation board having a plurality of stock display units each having a plurality of price indicators, a plurality of selective circuits common to the indicators of the various units, stock selecting means for extending said selective circuits to the price indicators of a predetermined display unit and comprising a plurality of variably positionable switches for extending said selective circuits to the price indicators of a predetermined unit, code selective devices for operating said switches, a plurality of groups of storage relays for variably operating said code selective devices, a distributor for variably operating said storage relays, selective means for determining which of the price indicators of the predetermined unit are to be operated and comprising a plurality of variably positionable switches, a plurality of groups of storage relays controlled by said distributor, and a code selective device for each of the second mentioned storage relay groups controlled thereby and determining the setting of said second mentioned switches.

CLYDE SMITH.